(12) United States Patent  (10) Patent No.: US 7,395,251 B2
Linsker  (45) Date of Patent: Jul. 1, 2008

(54) NEURAL NETWORKS FOR PREDICTION AND CONTROL

(75) Inventor: Ralph Linsker, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 11/171,447

(22) Filed: Jul. 1, 2005

(65) Prior Publication Data
US 2007/0022068 A1    Jan. 25, 2007

(51) Int. Cl.
G05B 13/02  (2006.01)
G06E 1/00  (2006.01)
G06E 3/00  (2006.01)
G06F 15/18  (2006.01)
G06G 7/00  (2006.01)

(52) U.S. Cl. ........................................... 706/23
(58) Field of Classification Search ............... 706/23; 607/60
See application file for complete search history.

(56) References Cited

U.S. PATENT DOCUMENTS

| | | | |
|---|---|---|---|
| 5,408,424 A | | 4/1995 | Lo |
| 5,877,954 A * | | 3/1999 | Klimasauskas et al. ....... 700/29 |
| 5,956,702 A * | | 9/1999 | Matsuoka et al. ............. 706/22 |
| 5,963,929 A | | 10/1999 | Lo |
| 6,272,480 B1 | | 8/2001 | Tresp et al. |
| 6,278,962 B1 | | 8/2001 | Klimasauskas et al. |
| 6,748,098 B1 * | | 6/2004 | Rosenfeld ................... 382/131 |
| 6,978,182 B2 * | | 12/2005 | Mazar et al. ................. 607/60 |
| 7,009,511 B2 * | | 3/2006 | Mazar et al. ................. 340/531 |
| 7,065,409 B2 * | | 6/2006 | Mazar ........................ 607/60 |
| 7,076,091 B2 * | | 7/2006 | Rosenfeld ................... 382/131 |
| 7,127,300 B2 * | | 10/2006 | Mazar et al. ................. 607/60 |
| 7,289,761 B2 * | | 10/2007 | Mazar ........................ 455/1 |
| 7,292,139 B2 * | | 11/2007 | Mazar et al. ................. 340/531 |

OTHER PUBLICATIONS

Jitter and error performance analysis of QPR-TCM and neural network equivalent systems over moblile satellite channels Ucan, O.N.; Personal, Indoor and Mobile Radio Communications, 1996. PIMRC'96., Seventh IEEE International Symposium on Vol. 2, Oct. 15-18, 1996 pp. 457-461 vol. 2 Digital Object Identifier 10.1109/PIMRC.1996.567436.*

(Continued)

Primary Examiner—Michael B Holmes
(74) Attorney, Agent, or Firm—Whitham, Curtis, Christofferson & Cook, PC; Stephen C. Kaufman

(57) ABSTRACT

Neural networks for optimal estimation (including prediction) and/or control involve an execution step and a learning step, and are characterized by the learning step being performed by neural computations. The set of learning rules cause the circuit's connection strengths to learn to approximate the optimal estimation and/or control function that minimizes estimation error and/or a measure of control cost. The classical Kalman filter and the classical Kalman optimal controller are important examples of such an optimal estimation and/or control function. The circuit uses only a stream of noisy measurements to infer relevant properties of the external dynamical system, learn the optimal estimation and/or control function, and apply its learning of this optimal function to input data streams in an online manner. In this way, the circuit simultaneously learns and generates estimates and/or control output signals that are optimal, given the network's current state of learning.

46 Claims, 14 Drawing Sheets

OTHER PUBLICATIONS

Performance of trellis coded M-PSK and neural network equivalent systems over partial response-fading channels with imperfect phase reference Ucan, O.N.; Universal Personal Communications, 1996. Record., 1996 5th IEEE International Conference on Vol. 2, Sep. 29-Oct. 2, 1996 pp. 528-532 vol. 2 Digital Object Identifier 10.1109/ICUPC.1996.56.*

Jitter and error performance analysis of QPR-TCM and neural network equivalent systems over mobile satellite channels Ucan, O.N.; Personal, Indoor and Mobile Radio Communications, 1996. PIMRC'96., Seventh IEEE International Symposium on vol. 2, Oct. 15-18, 1996 pp. 457-461 vol. 2 Digital Object Identifier 10.1109/PIMRC.1996.567436.*

Performance of trellis coded M-PSK and neural network equivalent systems over partial response-fading channels with imperfect phase referenceUcan, O.N.; Universal Personal Communications, 1996. Record., 1996 5th IEEE International Conference on vol. 2, Sep. 29-Oct. 2, 1996 pp. 528-532 Digital Object Identifier 10.1109/ICUPC.1996.562629.*

A locally quadratic model of the motion estimation error criterion function and its application to subpixel interpolations Xiaoming Li; Gonzales, C.; Circuits and Systems for Video Technology, IEEE Transactions on vol. 6, Issue 1, Feb. 1996 pp. 118-122 Digital Object Identifier 10.1109/76.486427.*

Subband video coding with smooth motion compensation Fuldseth, A.; Ramstad, T.A.; Acoustics, Speech, and Signal Processing, 1996. ICASSP-96. Conference Proceedings., 1996 IEEE International Conference on vol. 4, May 7-10, 1996 pp. 2331-2334 vol. 4 Digital Object Identifier 10.1109/ICASSP.1996.547749.*

R. Linsker; IBM Research Division, T.J. Watson Research Center, Neural Computation 4, 691-702 (1992); Massachusetts Institute of Technology: Local Synaptic Learning Rules Suffice to Maximize Mutual Information in a Linear Network.

R. J. Williams, College of Computer Science, Northeastern University, National Science Foundation; pp. 1-6; Training Recurrent Networks Using the Extended Kalman Filter.

I. Szita, et al.; Neural Computation 16, 491-499 (2004) Massachusetts Institute of Technology; Kalman Filter Control Embedded into the Reinforcement Learning Framework.

G. Szirtes, et al.; Science Direct; Neurocomputing; Neural Kalman Filter; p. 1-7.

I. Rivals, et al.; Neurocomputing 20 (1-3): 279-294 (1998); A Recursive algorithm based on the extended Kalman filter for the training of feedforward neural models.

R. Linsker; Science Direct; Neural Networks 18 (2005) 261-265; Improved local learning rule for information maximization and related applications.

R. Kalman, Journal of Basic Engineering; Mar. 1960 pp. 35-45: A New approach to Linear Filtering and Prediction Problems.

S. Beckor, et al.: Department of Compter Science; Univeristy of Toronto; Nature vol. 355; Jan. 1992; pp. 161-163: Self-organizing neural network that discovers surfaces in random-dot stereograms.

G. Puskorius, et al.; Kalman Filtering and Neural Networks; 2001 J. Wiley and Sons, Inc.: Parameter-Based Kalman Filter Training: Theory and Implementation pp. 23-66.

S. Singhal, et al.: 1989, Bell Communications Research, Inc.: pp. 133-141: Training Multilayer perceptrons with the extended Kalman Algorithm.

* cited by examiner

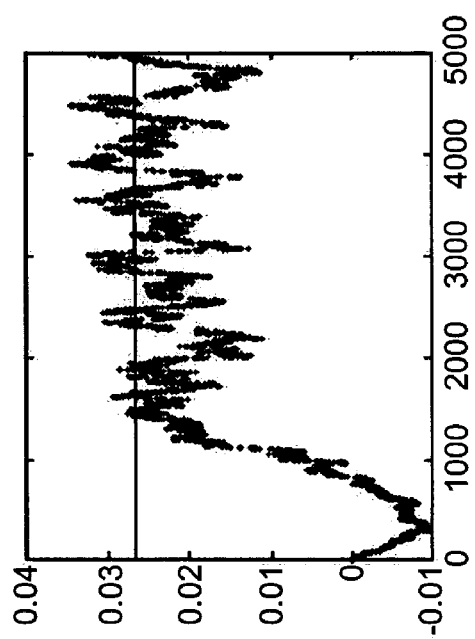
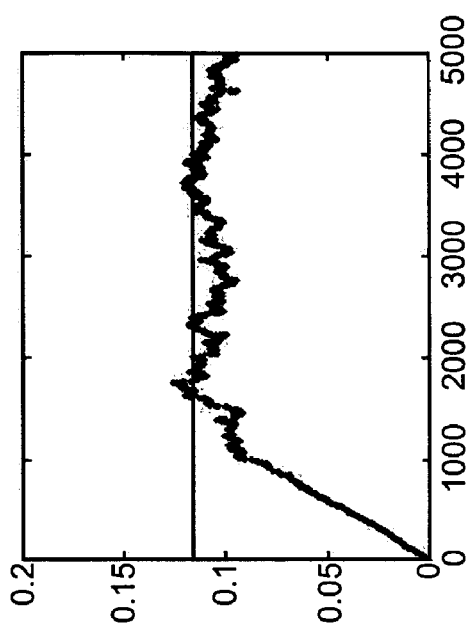
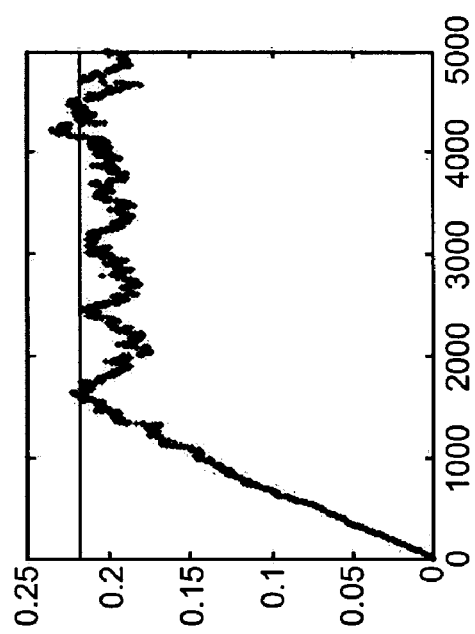
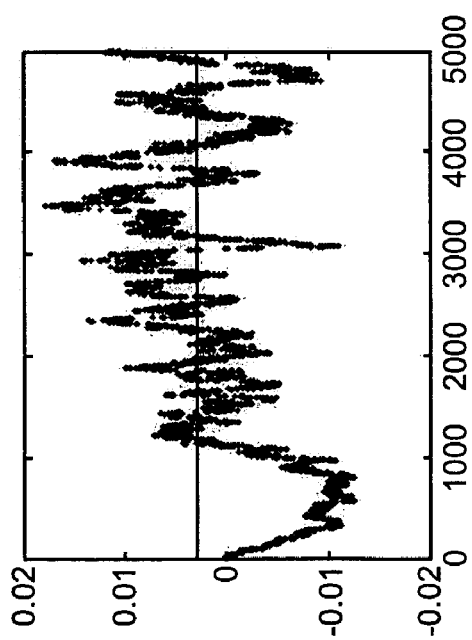
Figure 12A
Figure 12B
Figure 12C
Figure 12D

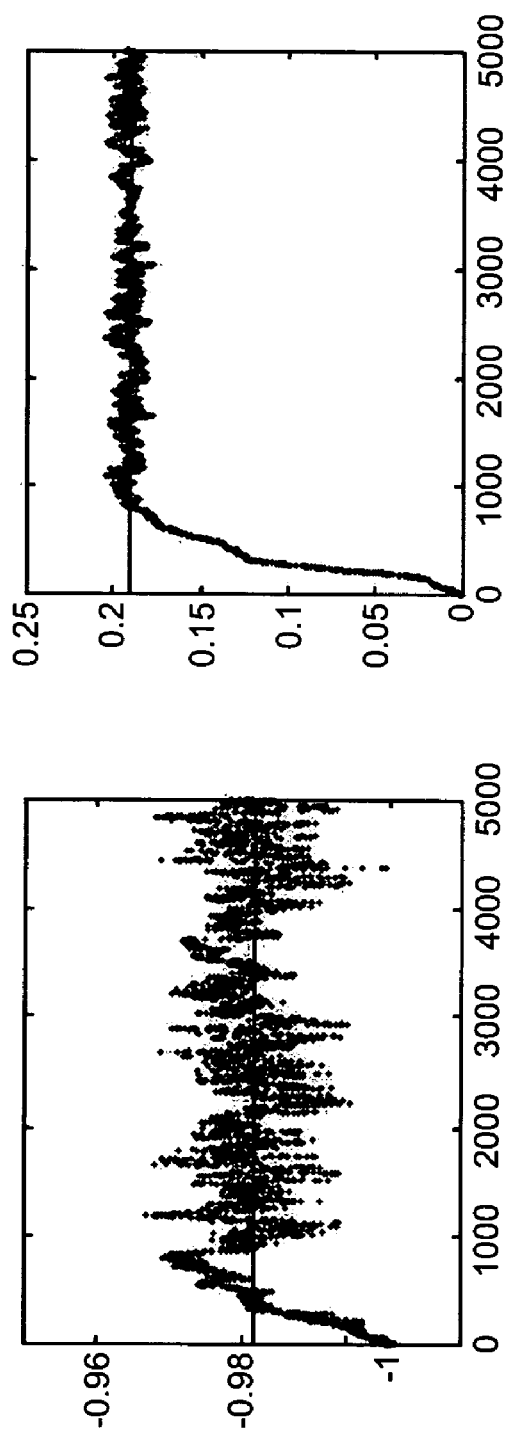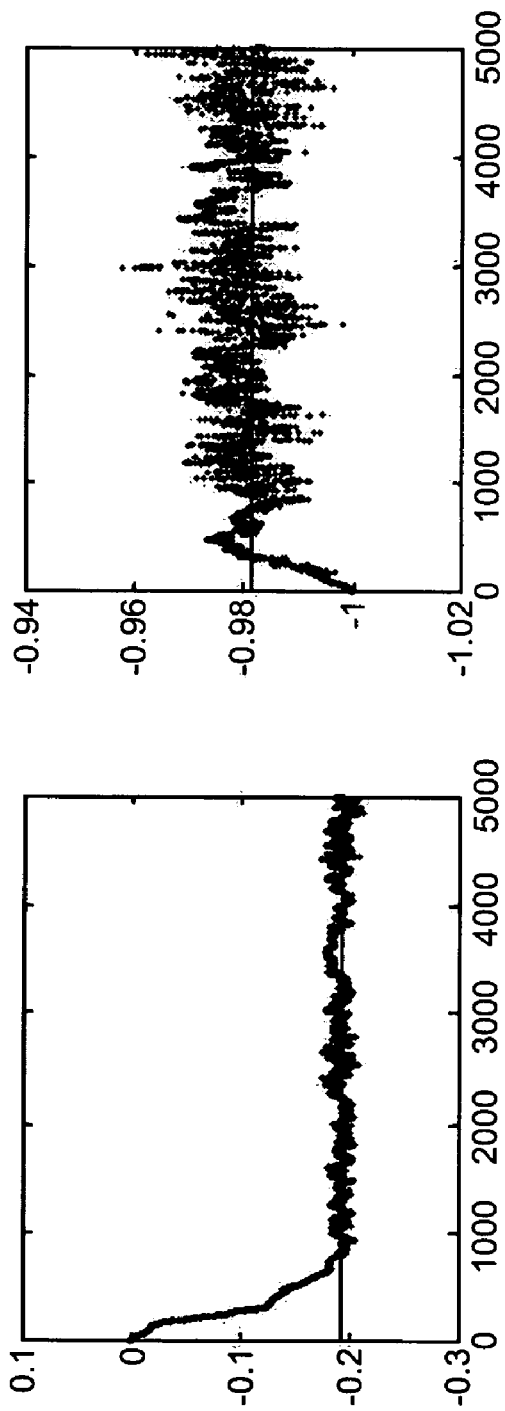
Figure 14A
Figure 14B
Figure 14C
Figure 14D

NEURAL NETWORKS FOR PREDICTION AND CONTROL

BACKGROUND OF THE INVENTION

1. Field of the Invention

The present invention generally relates to neural networks, and more particularly, to recurrent neural networks for estimation (including prediction) and/or control.

2. Background Description

This invention is concerned with the problems of optimal, or approximately optimal, estimation and control. In a standard formulation of these problems, there is an external system or "plant" described at each of a plurality of times by a plant state that evolves over time according to a stochastic plant process, and there is a stochastic measurement process that produces measurements at each of a plurality of times. The optimal estimation problem consists of using the measurements to generate estimates of the plant states over time, so as to minimize a specified measure of the error between the estimated and actual plant states. The term "estimation" can refer to prediction, filtering, and/or smoothing, as described below.

The optimal control problem consists of using the measurements, or estimates thereof, to generate control signals that have the effect of altering the plant state in such a manner as to minimize a specified measure of the error between the actual and a specified desired (or target) plant state at one or more future times. A function, called the "cost-to-go", is typically specified. This function describes the cost of a process that generates and applies a succession of control signals to the plant, resulting in a succession of plant states over time. Given the current plant state or an estimate thereof, or a measurement vector that conveys information about the plant state, it is desired to generate a sequence of control signal outputs such that the cost-to-go is substantially minimized. The cost is typically a combination of terms that reflect the cost of generating control output actions, and the cost (or benefit, with a minus sign applied) of the plant state approaching or reaching a desired target state (or succession of such target states).

A classical method for treating optimal estimation and control problems is the Kalman filter or extended Kalman filter. The Kalman filter (KF) was first described in R. E. Kalman, Trans. ASME, Series D, *Journal of Basic Engineering*, Vol. 82 (1960), pp. 35-45. It solves the problems of optimal estimation and control when the plant and measurement processes satisfy certain conditions of linearity. The KF method also assumes knowledge of several types of parameters. It assumes that the deterministic portions of both the plant evolution (over time) process, and the measurement process (giving the relationship between the plant state and the measurement vector), are known; and that the noise covariances of both the plant evolution and measurement processes are also known. When the linearity condition is not strictly satisfied, the extended Kalman filter method (EKF) can be used to generate a linearized approximation of the plant and measurement processes. The EKF may be iteratively applied to obtain a sequence of linearized approximations. When the parameters of the plant evolution and measurement processes are not known, one can use a separate computation, "system identification", to determine or estimate these parameters.

Kalman Optimal Estimation and Control

The state of an external system (the "plant") governed by linear dynamical equations is described by a vector $x_t$, which evolves in discrete time according to $$x_{t+1} = Fx_t + Bu_t + m_t \tag{1}$$

where the matrix F describes the noise-free evolution of x, m denotes an additive plant noise vector, u denotes an optional vector that may be generated as a control output signal by a controller system, and matrix B describes the effect of u on the plant state x. Sensors measure a linear function of the system state, with additive measurement noise n:

$$y_t = Hx_t + n_t. \tag{2}$$

In classical Kalman estimation (e.g., the above-cited reference), it is assumed that the matrices H and F are known, and that the covariance matrices $Q = Cov(m)$ of the plant noise, and $R = Cov(n)$ of the measurement noise, are also known. Here $E(\ldots)$ denotes expectation value, $Cov(z) \equiv E[(z-\bar{z})(z-\bar{z})']$, $\bar{z}$ is the mean of z, the prime symbol denotes matrix transpose, I will denote the identity matrix, and n and m are assumed to have zero mean.

Kalman Estimation

The goal of the optimal estimation process is to generate an optimal estimate of $x_\tau$ given a set of measurements $\{y_1, y_2, \ldots, y_t\}$. If $\tau$ is greater than, equal to, or less than t, the estimation process is referred to as prediction, filtering, or smoothing, respectively. An "optimal" estimate is one that minimizes a specified measure of the error between the estimated and the true plant state. Typically, this measure is the mean square error (MSE) of the estimated with respect to the true state.

Further notation and definitions are as follows. The a priori state estimate is $\hat{x}_t^- \equiv \hat{x}(t|y_1, \ldots, y_{t-1})$, where the right-hand side denotes the estimated value of $x_t$ given the values of $\{y_1, \ldots, y_{t-1}\}$. The a posteriori state estimate is $\hat{x}_t \equiv \hat{x}(t|y_1, \ldots, y_t)$. The expression $$\eta_t^- \equiv (y_t - H\hat{x}_t^-) \tag{3}$$

is called the measurement "innovation" or "residual", and is the difference between the actual and predicted (in the case that $\tau = t+1$) measurements at time t. The a priori and a posteriori state estimate errors are, respectively, $\xi_t^- = x_t - \hat{x}_t^-$ and $\xi_t = x_t - \hat{x}_t$, and the covariances of these respective errors are $p_t^- = Cov(\xi_t^-)$ and $p_t = Cov(\xi_t)$. Since the estimation algorithm does not have access to the actual state $x_t$, $p_t^-$ and $p_t$ are not directly known. They are iteratively estimated by the algorithm below, starting from arbitrary initial values; these estimates at time t are denoted by (capital) $P_t^-$ and $P_t$ respectively.

Kalman's solution for the optimal filter (i.e., the case $\tau = t$) is then described by the following procedure: Given arbitrary initial values for $\hat{x}_0$ and $P_0$ ($P_0$ is however typically initialized to be a symmetric positive-definite matrix), iteratively compute for $t=1, 2, \ldots$:

$$\hat{x}_t^- = F\hat{x}_{t-1} + Bu_{t-1} \tag{4}$$

$$P_t^- = FP_{t-1}F' + Q \tag{5}$$

$$K_t = P_t^- H'(HP_t^- H' + R)^{-1} \tag{6}$$

$$\hat{x}_t = \hat{x}_t^- + K_t \eta_t^- = \hat{x}_t^- + K_t(y_t - H\hat{x}_t^-) \tag{7}$$

$$P_t = (I - K_t H) P_t^- (I - K_t H)' + K_t R K_t'. \tag{8}$$

Combining Eqs. 5 and 8 yields $$P_{t+1}^- = FP_t^- F' + Q - FK_t(HP_t^- H' + R)K_t' F'. \qquad (9)$$

This iterative solution may be regarded as consisting of two parts: an execution step during which a new estimate is computed (Eqs. 4 and 7) using an estimation function (here, $K_t$ or $(I-K_tH)$, which are related to $P_t^-$); and an updating step during which a new estimation function is generated (Eqs. 6 and 9) in terms of an estimation function at a previous time.

The solution for the optimal prediction problem with $\tau = t+1$ is given by the same equations, using Eq. 4 to generate the optimal prediction $\hat{x}_{t+1}^-$ given measurements through time t.

One extension of classical Kalman filtering, as noted above, is the extended Kalman filter (EKF) method. This can be used when the linearity conditions above are not strictly satisfied. EKF can be used to generate a linearized approximation of the plant and measurement processes, and may be iteratively applied to obtain a sequence of linearized approximations. The resulting solution is not strictly optimal in general, but only approximately so. The Kalman equations can also be generalized by allowing one or more of the matrices H, F, R, and Q to be functions of t. Also, when the parameters of the plant evolution and measurement processes are not known, one can perform a separate computation, "system identification", to determine or estimate these parameters.

Kalman Control

We turn now to optimal Kalman control. The stochastic linear quadratic Gaussian (LQG) control problem can be described as follows, in the case of "full observability" (i.e., where the plant state vector $x_t$ at each time is assumed known). From a current plant state $x_{tcurr}$ at time tcurr<N, it is desired to optimize a set of control output signals $\{u_{tcurr}, u_{tcurr+1}, \ldots, u_{N-1}\}$. The trajectory of the plant state—that is, the sequence of states $\{x_{tcurr+1}, \ldots, x_N\}$—will depend on the choice of the u values, on the initial state $x_{tcurr}$, and on the noise terms $\{m_{tcurr}, \ldots, m_{N-1}\}$.

The quantity to be optimized is called the "cost-to-go", and has the following form. The cost-to-go of the trajectory comprises a control-action cost $u_t' g u_t$ and a target-deviation cost $x_t' r x_t$ for each time step t from tcurr to N, where both g and r are specified symmetric positive-definite matrices. Thus the cost-to-go, denoted J, is $$J = \sum_{t=tcurr}^{N-1} (u_t' g u_t + x_t' r x_t) + x_N' r x_N. \qquad (10)$$

The optimization problem consists of determining the set of values of u for which the value of J, averaged over initial position $x_{tcurr}$ and plant noise, is a minimum. The solution has the form $u_t = -L_t x_t$, where L is the Kalman control matrix at time t.

In one extension of the above formulation, at least one of the matrices g and r may be functions of t. Also, the cost-to-go function may include additional cross-terms involving both x and u. See, for example, the University of Lund (Sweden) online lecture notes at http://www.control.lth.se/~kursdr/lectures/f13LQsynth.pdf. Also, the cost-to-go may be described in terms of a desired target state $x_{targ}$, in which case each $x_t$ in Equation 10 should be replaced by $x_t - x_{targ}$. In that case, the target state may itself vary with time, as for example in the case that the goal is to generate control signals so that the plant state $x_t$ may approximately follow a desired target trajectory.

In certain special cases, the cost-to-go may be formulated in such a way that the optimal matrices $L_t$ are independent of time. This is referred to as a "stationary" optimal control problem. In one such case, the final time t=N is considered to be effectively infinite. In another such case [see, e.g., Szita and Lörincz, *Neural Computation*, vol. 16 (2004), pp. 491-499], the final time t=N is considered to be indeterminate; i.e., if the cost-to-go terms have not terminated by an arbitrary time step t, they are assumed to terminate at the next time step t+1 with a given constant probability.

For the optimal control problem stated above, the classical Kalman solution is described by the following procedure, where S is an auxiliary matrix that is a function of t. Starting with $S_N = r$, iteratively compute for the decreasing sequence of time index values t=N, N−1, . . . , tcurr:

$$L_t = (B' S_t B + g)^{-1} B' S_t F \qquad (11)$$

$$S_{t-1} = F' S_t F + r - L_t'(B' S_t B + g) L_t. \qquad (12)$$

Then, for t=tcurr and (optionally) for later t, use the Kalman $L_t$ matrices to compute the control vectors $u_t$:

$$u_t = -L_t x_t \qquad (13)$$

This process generates the set of optimal control output vectors $\{u_{tcurr}, \ldots, u_{N-1}\}$. As in the case of estimation, but with a key difference (regarding the order of computation of functions having different values of the time index), this iterative solution may be regarded as consisting of two parts: an execution step during which a new control vector is computed (Eq. 13) using a control function (here, $L_t$, which is related to $S_t$); and an updating step during which a new control function is generated (Eqs. 11 and 12) in terms of a control function that is associated with a later time index.

Note that, as observed by Kalman, the solutions to the optimal estimation and control problems are mathematically "dual" to one another. Equations 11, 13, and 12 are related by this duality to Equations 6, 7, and 9 of the Kalman filter solution, respectively. As noted above, however, the S and L matrices of the control problem are iteratively computed from later to earlier time index values (i.e., "backward in time"), whereas the $P^-$ and K matrices of the filtering problem are computed "forward in time". The Kalman filter matrix K can therefore be computed at time t and immediately applied to determine the optimal a posteriori state estimate $\hat{x}_t$, whereas the Kalman control matrices $L_t$ must first be computed for a sequence of decreasing time index values, before they can be applied at the current time t=tcurr and then at later times.

Artificial Neural Networks

An artificial neural network (ANN) is characterized by processor nodes and connections between them, each node and connection typically being capable of performing only relatively simple computations, wherein the behavior of the nodes and connections is described by parameter values which either may be fixed or may be modifiable according to a specified learning or update rule. Some of the parameters describing the connections are referred to as connection "weights" or "strengths". An ANN may be implemented either in hardware, or as software that is run on a general-purpose computer. A processor node is a computation unit (in hardware) or a simulation of such a unit (in software), wherein at least one input value is transformed into at least one output value. Typically the node computes, as its output, a specified function (which may be nonlinear) of the sum of its input values. Each input value or "activity" is typically described by a numerical value that may be time-varying.

Time may be continuous-valued or may consist of discrete time steps. In a hardware implementation, an activity may be represented by any of a variety of signals, e.g., a level of, or change in level of, a current, voltage, or other physical quantity, wherein the magnitude, timing, and/or repetitive nature of the level or change carries the information. A processor node may be an internal node of the network (connected only to other nodes of the network), or may be a sensor or input node (providing or transducing information from the external environment to the network), or may be an effector or output node (generating signals from the network that influence the external environment).

Each connection conveys an activity value from one processor to another. The connection may be passive (i.e., may just transmit the value unchanged from one processor to the other) or may be active (transform the value en route). In the latter case, the particular transformation is specified by at least one parameter. Typically the transformation consists of a simple multiplication of the activity value by the connection strength.

Neural network computations are often described in terms of the behavior of a set of related nodes and connections. Suppose that there are two sets of nodes, one set of which (the source nodes) provides input to the other set (the target nodes). An activity vector, for example $z=(z^1, z^2, \ldots, z^n)$, at a given time represents the fact that the activity at node k is equal to $z^k$ at that time. (Note that here the superscripts denote index values, not exponents.) A matrix C refers to a set of connections from source to target nodes, where $C^{kj}$ is the strength of the connection from node j to node k. In the case that each target node simply computes the sum of its weighted inputs, then a target activity vector z is related to a source activity vector v by the matrix equation z=Cv, which represents the set of equations $z^k=\Sigma_j C^{kj} v^j$. If the kth target node computes a nonlinear function $g^k$ of the sum of its inputs, then we have instead $z^k=g^k(\Sigma_j C^{kj} v^j)$.

In an ANN, connection weights may be "directed", meaning that $C^{ji}$ and $C^{ij}$ correspond to different connections (from i to j and from j to i respectively), and (if both connections exist) have strengths that need not be equal; or "undirected", meaning that the two strengths are required to be equal to each other.

A layered ANN is one in which the nodes are organized into two or more groupings (called layers, but in the present invention not implying any particular geometric arrangement). Within a layered network, the connections may be within (a) a single layer (lateral connections), (b) from a "lower" to a "higher" layer in a hierarchy (feedforward connections), and/or (c) from a "higher" to a "lower" layer (feedback or recurrent connections). A layered ANN with recurrent connections is also called a recurrent neural network (RNN).

Adjustable connection strengths, and other adjustable parameters, may be modified using a learning rule. Typically, a learning rule is "local", meaning that the rule makes use only of activity values, connection strengths, and other parameters or state information that are available at the node or connection being modified. For example, a simple version of a "Hebbian" learning rule changes a strength $C^{ji}$ by an amount proportional to the product of the activities $z^i$ and $z^j$ at either end of the connection from i to j. In some cases, a learning rule may make use of certain global values or signals that are available at all, or a subset of, the nodes and connections. For example, in a "reinforcement learning" algorithm, the change in strength may be proportional to a quantity that represents the overall benefit or cost resulting from an output signal produced by the network at a previous time step.

Also, in some cases, a subset of corresponding connections may be considered to be coupled or "ganged" together, so that they all have the same connection strength, and are all modified in tandem by the average of the amounts by which each such connection would have been modified if they were not so coupled. For one example of a network computation using ganged connections, see S. Becker and G. Hinton, *Nature*, vol. 355, pp. 161-163 (1992). This may be done either to speed up a computation (as in the above reference), or to cause corresponding parts of a network to behave in a coordinated manner.

Other types of ANNs and learning rules have been described in the literature; for a good introduction, see J. Hertz, A. Krogh, and R. G. Palmer, *Introduction to the Theory of Neural Computation*, Addison-Wesley 1991. As one example, the information conveyed between nodes of an ANN may be carried by the precise timing of spikes (rapid changes in activity value) rather than by the numerical value of the activity itself. As a second example, another type of ANN is a "radial basis function" (RBF) network. The output of an RBF node decreases as a function of the distance between the set of inputs to the node (regarded as a vector) and a "prototype vector" that is stored as a set of parameters for that node; the prototype vector is typically modified according to an appropriate learning rule.

Use of ANNs in Estimation and Control Problems

Typically, an ANN is used to perform an estimation function (such as prediction) by a process of "supervised learning", using a training set comprising both measurement values and the desired plant state values to be estimated. The network parameters (e.g., the connection strengths) are initialized, a set of measurement values is presented as input to the ANN, a set of output values is generated by the ANN, a measure of the error between the ANN's output and the desired output (the plant state at a given time) is computed, that error measure is used to modify the connection weights (and other adjustable parameters, if any) of the ANN according to a specified learning algorithm such as the "back-propagation" algorithm, and the process is iteratively repeated with a new set of inputs. The ANN's weights may thereby converge to values that cause the ANN to generate outputs whose error measure is sufficiently small.

To treat the control problem, an ANN is typically used to generate one or more control outputs whose values depend upon the measurement inputs and the ANN's weights; the control outputs act on the plant (or on a simulated model of the plant) to alter the plant state; a measurement (or computation) of the new plant state is used as the new input to the network; and a measure of the error between the measured plant state and the target plant state is computed and used to modify the ANN's weights in accordance with a learning algorithm.

Standard methods for training the weights of a recurrent neural network (RNN) based on time sequences of input values and desired output values include "real-time recurrent learning" and "back-propagation through time", both of which are described in Hertz et al., *ibid.*, pp. 182-186.

J. T. Lo, in U.S. Pat. Nos. 5,963,929 and 5,408,424, describes the use of an RNN for optimal or near-optimal filtering (a form of estimation). In the '929 patent, a "recursive neurofilter" is used to estimate a signal process with respect to an estimation error criterion, where at least one weight is a nonlinear weight and is adjusted during a separate training process. Also described is the use of a second "neurofilter" (a second circuit or algorithm), to produce an approximation of the statistical error of the estimates. In both the '929 and '424 patents, the neural network is trained using pairs of inputs—measurement data and the actual state of the plant—as discussed above. These pairs are used to train the connection strengths in a generic RNN (see col. 42 of the '424 patent specification). The patent relies on the general knowledge of "supervised learning" methods in the ANN field, regarding how to learn to match actual output with desired output, in order to train the weights. Note that information about the actual plant state is required for operation of this method. In practice, however, one may only have access to measurement data, and not to the plant state itself, preventing one from using this method. Note also that: the adjustable weights are kept fixed during operation of the network (that is, those weights are not being learned or adjusted while the filter is actually performing its estimation of a signal process); the second "neurofilter" is distinct from the first "neurofilter" and although Kalman estimation is discussed as an alternative estimation method, Kalman estimation is not involved in the networks described (i.e., the networks neither learn nor use Kalman estimation).

Neural networks have been used in conjunction with the Kalman estimation (also referred to as the Kalman filter, or KF) equations in several ways.

First, the KF or EKF equations have been used to compute how the weights in an ANN should be modified. The ANN weights to be determined are treated as the unknown parameter values in a system identification problem, sets of input values and desired output values are specified, and the KF or EKF equations are used to determine the ANN weights based on the sets of input and desired-output values. The equations are solved by means of conventional mathematical steps including matrix multiplication and inversion. That is, the weights are not computed or updated (learned) by means of a neural network. Instead, the weights are read out from the neural network, provided as input arguments to the KF or EKF algorithm (which is not a neural network algorithm), the updated weight values are then provided as outputs of the KF or EKF algorithm, and the updated weight values are then entered into the neural network as the new weight values for the next step of the computation. For examples of this combined usage of an ANN in conjunction with the classical KF or EKF equations, see: S. Haykin (ed.), *Kalman Filtering and Neural Networks*, Wiley-Interscience, 2001, and in particular the chapter by G. V. Puskorius and L. A. Feldkamp; S. Singhal and L. Wu, "Training Multilayer Perceptrons with the Extended Kalman Algorithm", in D. S. Touretzky (ed.), *Advances in Neural Information Processing Systems*, vol. 1 (Morgan Kaufmann Publ., San Mateo Calif., 1989), pp. 133-140; R. J. Williams, "Training recurrent networks using the extended Kalman filter", *in Proceedings of the International Joint Conference on Neural Networks*, June, Baltimore, Md., Vol. IV (1992), pp. 241-246; and I. Rivals and L. Personnaz, "A recursive algorithm based on the extended Kalman filter for the training of feedforward neural models", *Neurocomputing*, vol. 20 (1998), pp. 279-294.

Second, one can combine the output from a nonlinear ANN with that of a (non-neural) KF algorithm, to improve predictions when applied to a nonlinear plant process. See for example Klimasauskas et al., "Hybrid linear—neural network process control", U.S. Pat. Nos. 6,278,962 and 5,877,954. This method involves two analyzers: a primary "data-derived" one that generates a primary output, and a secondary "error correction analyzer" that generates a predicted error output; then the two analyzers' outputs are summed. Here the NN weights are trained to minimize the difference between (a) the sum of the linear filter output and the NN output, and (b) the desired output (e.g., the actual signal vector). That is, the NN learns how the linear filter output differs from the actual signal (or the desired output), and attempts to compensate for that difference. Here the NN does not learn a Kalman filter (KF); the KF is used alongside the NN, and the two perform complementary tasks. The KF is not computed or learned by means of a neural network or a set of neural computations. A similar combination is used in Tresp et al., "Method and arrangement for the neural modelling of a dynamic system with non-linear stochastic behavior", U.S. Pat. No. 6,272,480. This method combines the output of a nonlinear recurrent neural network (RNN), with an error measure (based on a linear-equation model of the system error) that is modeled using a KF, in order to alter the RNN. The KF equations are not implemented within a neural network. They are solved, e.g., using a conventional computer program, and their values are then used to adjust the neural network's behavior.

Third, an ANN learning rule has recently been described that is motivated by the KF equations, although it does not implement the learning of a KF within an ANN. See G. Szirtes, B. Póczos, and A. Lőrincz, in *Neurocomputing*, vols. 65-66 (2005), pp. 349-355. In this method, the KF equations are first altered in several ways. One of these alterations replaces the matrix product HK, where H is as in Eq. 2 and K is the KF matrix, by the identity matrix I. This assumption that HK is approximately equal to I is, however, not valid in general, but only under special conditions. Another of these alterations neglects the off-diagonal terms in a matrix that is being updated. This alteration is stated to be justified when the estimated plant process satisfies an assumption of "independent component transformation". For this assumption to hold, special preprocessing steps are in general required. Another alteration neglects a "self-excitatory" contribution. Yet another alteration introduces a random vector in order "to provide a conventional neuronal equation", but this alteration incorrectly changes a significant term in the learning equation, so that the contribution of that term is averaged to zero. These alterations cause the resulting "learning rule" to fail to learn a KF matrix, even approximately. Furthermore, results displayed in that reference show a decreasing estimation error. However, the decrease shown is not the result of an approximation to a KF matrix having been learned. Similar results are obtained even when an arbitrary matrix K is used (instead of using an approximation to the KF matrix), with no learning at all taking place. For these reasons, this method does not implement the learning of a KF within an ANN.

A classic formulation of the optimal control problem is Bellman's method of dynamic programming, in which (at each time step) a system has a set of allowed transitions from each state to a set of other states. A cost is associated with each transition, and the problem is to determine an optimal or near-optimal control policy that governs which transition to choose when in each state, to minimize an overall cost function. A class of ANN algorithms, based on "temporal difference" (TD) learning (a form of reinforcement learning) and its extensions, has been developed to learn the transition costs and a control policy. For a reference on TD learning (and reinforcement learning more generally) see: R. S. Sutton and A. G. Barto, *Reinforcement Learning: An Introduction*, MIT Press, 1998.

For the more specialized case of a linear quadratic Gaussian (LQG) system, or for a linear quadratic (LQ) deterministic system, the optimal Kalman control (KC) solution is as discussed above. The general KC solution has not been implemented within an ANN. However, a solution of a particular specialized form of the LQG control problem, namely, the "stationary" optimal control problem discussed above, has been implemented using an ANN with a TD learning rule (Szita and Lörincz, loc. cit.). In this special case, as noted above, the cost-to-go terms are assumed to terminate at any future time step with a given constant probability.

SUMMARY OF THE INVENTION

It is therefore an object of the invention to provide a method for estimation and/or control which involves a learning step and an execution step, wherein at least the learning step is performed by neural computations.

A further object of the present invention is to provide a method for learning an optimal or near-optimal estimation and/or control function, in which the learning is performed by means of neural computations. These computations may be implemented within an artificial neural network, either in hardware or software form.

A further object of the present invention is to integrate, within a single set of neural computations (e.g., a single ANN), (a) the learning of optimal or near-optimal estimation and/or control functions and (b) the execution of an estimation and/or control process using those learned functions, so that both the learning and execution can occur at the same time and using the same measurement input values.

A further object of the present invention is to integrate, within a single set of neural computations (e.g., a single ANN), (a) the learning and use of an estimation and/or control function and (b) the learning and use of the required parameters describing the combined plant evolution and measurement processes (system identification), so that both steps (a) and (b) can occur at the same time and using the same measurement input values.

A further object of the present invention is to perform optimal or near-optimal estimation and/or control by means of neural computations, in the case that only measurement values are available as input, and the actual plant state values are not known or available as input.

A further object of the present invention is to perform optimal or near-optimal control, in the case that the "cost-to-go" function is not limited to the special case of a stationary optimal control problem.

It is to be noted that the Kalman filter for estimation or control represents a special case of an estimation or control function.

The present invention teaches the design of neural networks and neural network equivalent systems for optimal or approximately optimal estimation and/or control, including the design of a neural network architecture—a circuit with prescribed sets of connections between sets of nodes—and a set of learning rules that cause the circuit's connection strengths to evolve so as to learn optimal or approximately optimal estimation and/or control functions.

According to one aspect of the present invention, there is provided a method for estimation which comprises the steps of (a) specifying an estimation error criterion, a class of allowed estimation functions, an initial estimation function selected from said class, and an initial measurement estimate, (b) inputting at least one measurement vector, (c) determining an updated estimation function using said estimation error criterion, a previously determined estimation function, a previous measurement estimate, and said at least one measurement vector, (d) determining an updated measurement estimate using an estimation function and said measurement vector, (e) outputting said updated measurement estimate, and (f) iterating steps (b) through (e) a plurality of times, wherein the step of determining an updated estimation function is performed using a neural network equivalent system (NNES).

According to another aspect of the invention, there is provided a method for control, comprising the steps of (a) specifying a control cost criterion, a class of allowed control functions, and an initial control function selected from said class, (b) specifying a sequence of time values, (c) for each time value in said sequence of time values, determining an updated control function corresponding to said time value using said control cost criterion and a previously determined control function, (d) inputting state data comprising at least one of a plant state vector, a measurement vector, or a measurement estimate, (e) determining a control vector using one of said updated control functions and said state data, (f) outputting said control vector, (g) optionally iterating steps (d) through (f) one or more times, and (h) iterating steps (b) through (g) one or more times, wherein step (c) is performed using a neural network equivalent system (NNES).

According to still another aspect of the invention, there is provided a neural network equivalent system (NNES) for estimation and/or control comprising a plurality of nodes connected to perform a sequence of steps in a prescribed order, said plurality of nodes comprising processors programmed or constructed to perform an execution step and/or a learning step using neural computations, input means for providing measurement values to said plurality of nodes, neural computation means for determining a plurality of measurement estimates, plant state estimates, and/or control vector signals using said measurement signals, and means for outputting said plurality of measurement estimates, plant state estimates, and/or control vector signals.

BRIEF DESCRIPTION OF THE DRAWINGS

The foregoing and other objects, aspects and advantages will be better understood from the following detailed description of a preferred embodiment of the invention with reference to the drawings, in which:

FIGS. 12A, 12B, 12C, and 12D are graphs showing the neurally learned values (computed by an ANN) of an estimation function $(I-HK_t)$ vs. time, and the solution using the classical Kalman estimation equations;

FIGS. 14A, 14B, 14C, and 14D are graphs showing the neurally learned values of a matrix, $(-F_t)$, that describes the combined effect of the plant dynamics and the measurement process, and the (constant) known value of the quantity $(-HFH^{-1})$, to which it converges.

DETAILED DESCRIPTION OF PREFERRED EMBODIMENTS OF THE INVENTION

Figure 1:
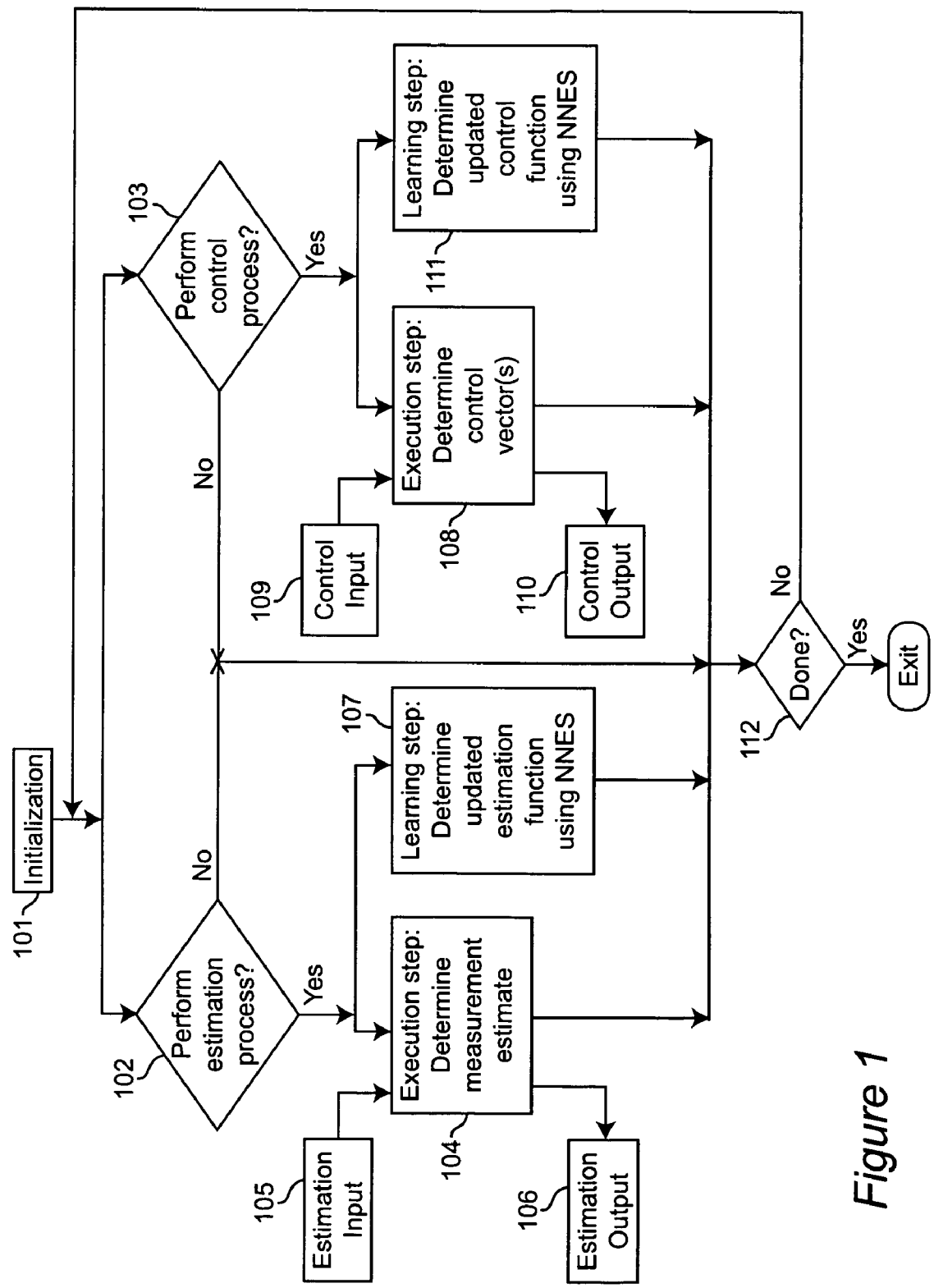
FIG. 1 is a block diagram showing the major steps taken in performing estimation and/or control in accordance with the teachings of the present invention.

FIG. 1 is a block diagram showing the major steps taken in performing estimation and/or control in accordance with the teachings of the present invention. At step 101, the estimation and/or control processes are initialized. If an estimation process is to be performed, this initialization comprises specifying an estimation error criterion, a class of allowed estimation functions, and an initial estimation function selected from the class of allowed estimation functions. If a control process is to be performed, this initialization comprises specifying a control cost criterion, a class of allowed control functions, and an initial control function selected from the class of allowed control functions. Steps 102 and 103 may be performed sequentially in either order, or in parallel. At step 102, it is determined whether an estimation process is to be performed. If it is, then steps 104 and 107 are performed. These steps may be performed sequentially in either order, or in parallel. At step 104, a measurement estimate is determined using a specified or previously determined estimation function (from step 101 or 107), and input provided by step 105. This input comprises at least one measurement vector, and (if the control process is also being performed) a control vector that is provided as output at step 110 below. The measurement estimate is provided as output at step 106. Step 107 determines an updated estimation function using a neural network equivalent system (NNES, defined below) and a previously specified or determined estimation function.

At step 103, it is determined whether a control process is to be performed. If it is, then steps 108 and 111 are performed. These steps may be performed sequentially in either order, or in parallel. At step 108, a control vector is determined using a specified or previously determined control function (from step 101 or 111), and input provided by step 109. This input comprises at least one of a plant state vector, a measurement vector, and a measurement estimate. A measurement estimate is available as the output of step 106, if the estimation process is also being performed. The control vector is provided as output at step 110. Step 111 determines an updated control function using a neural network equivalent system and a previously specified or determined control function. After the estimation and control processes have been carried out (or either of them has been bypassed), it is determined at step 112 whether a stopping condition has been satisfied; if it has not, a new iteration through the estimation and/or control processes commences at steps 102 and 103. Note that if only the estimation (or, respectively, the control) process is to be performed, then it is unnecessary to repeat step 103 (or, respectively, step 102) at each iteration.

Definitions of Terms Relating to ANNs

We define the set of "elementary neural computations" to consist of the following mathematical operations:

1. Addition or subtraction of two vectors.
2. Multiplication of a vector by a matrix.
3. Transformation of a vector v into a vector z wherein each component $z^i$ of z is related to the corresponding component $v^i$ of v by the relationship $z^i = g^i(v^i)$ where $g^i$ is a mathematical function of one variable. The mathematical function may be fixed or adjustable.
4. Changing (updating) a function $g^i$ (as used above) to a new function $\tilde{g}^i$ that depends on the form of $g^i$ and the value of $v^i$.
5. Changing (updating) the values of an adjustable matrix M, from M to $\tilde{M}$, wherein the matrix is associated with two vectors (that may be identical or distinct) v and z, and for each matrix component (j,i), $\tilde{M}^{ji}$ is a function of $M^{ji}$, $v^i$, and $z^j$. The function may, but need not, depend on the values of i and j. One example of such an operation is the linear transformation $\tilde{M}^{ji} = (1-\alpha_0)M^{ji} + \alpha_1 v^i z^j + \alpha_2 v^i + \alpha_3 z^j + \alpha_4$, where $\{\alpha_0, \ldots, \alpha_4\}$ are specified numerical values; however, the definition is not limited by the scope of this example.
6. "Ganging" of corresponding pairs of vector values to update a matrix, meaning: Changing the values of an adjustable matrix M, from M to $\tilde{M}$, wherein: the matrix is associated with a plurality of pairs of vectors; the kth such pair is denoted by [v(k), z(k)]; the ith component of vector v(k) is denoted $v^i(k)$ (similarly for z); $f^{ji}$ denotes a function of $v^i(k)$ and $z^j(k)$ that produces a numerical value as its output, and for each matrix component (j,i), $\tilde{M}^{ji}$ is a function of $M^{ji}$ and $\{f^{ji}(v^i(k), z^j(k))\}$ for all k. One example of such an operation is the linear transformation $$\tilde{M}^{ji} = (1-\alpha_0)M^{ji} + \Sigma_k[\alpha_1 v^i(k)z^j(k) + \alpha_2 v^i(k) + \alpha_3 z^j(k)] + \alpha_4,$$

where $\{\alpha_0, \ldots, \alpha_4\}$ are specified numerical values; however, the definition is not limited by the scope of this example.

Note that in general the participation or non-participation of a particular set of nodes in the ganging operation may change in accordance with other signals or the behavior of the network. For example, the sets of nodes that are ganged together may be determined by synchronous activity of nodes within and between those sets, as discussed further below. (However, in the specific embodiments described herein, the sets of nodes being ganged does not vary during operation of the network.) Also, a learning or update rule for connection strengths may use activity values over a range of times, rather than only at one time; this is true, for example, of "spike timing dependent" Hebbian learning rules.

Also, in the embodiments described herein, ganging is only used for updating a covariance matrix using the "batch learning method" option described below in the section entitled "Updating a covariance matrix or inverse covariance matrix: neural network methods". If one of the "incremental learning" methods described in that section is used instead, the ganging operation is not used.

7. Mode switching: Enabling the data flow, or flow of signals through a circuit, to be selected in accordance with a global signal that determines which of two or more modes is currently operative.

Each of the above elements corresponds in the following way to an element or set of elements within an ANN: A vector corresponds to a set of nodes, one node for each vector component. Both the node and its activity value may be denoted by a symbol of the form $v^i$. A matrix M corresponds to the strengths (weights) of a set of connections, from a set of nodes corresponding to a vector v, to a set of nodes corresponding to a vector z. The sets of nodes may be two distinct sets, or they may be the same set. If they are the same set, the connections are referred to as "lateral" connections. [In the special case that M is a diagonal matrix (i.e., $M^{ji}=0$ for i not equal to j), the only connections required are from $v^i$ to $z^i$ for each i.] The connection strength from node $v^i$ to node $z^j$ is denoted by $M^{ji}$. A node j, receiving connections of strengths $M^{ji}$ from each of a set of nodes i having activity values $v^i$, respectively, produces as output the activity value $z^j = g^j(\Sigma_i M^{ji} v^i)$. In the case of a "ganged" set of connections, the strength of each corresponding connection, from node i of set k (having activity value $v^i(k)$) to node j of set k (having activity value $z^j(k)$), has a value $M^{ji}$ that is the same for all k. The updating of $M^{ji}$ is likewise independent of k. Mode switching is accomplished either by the operation of one or more switches in a circuit, or by changes in the internal state of a set of nodes or connections.

Figure 2:
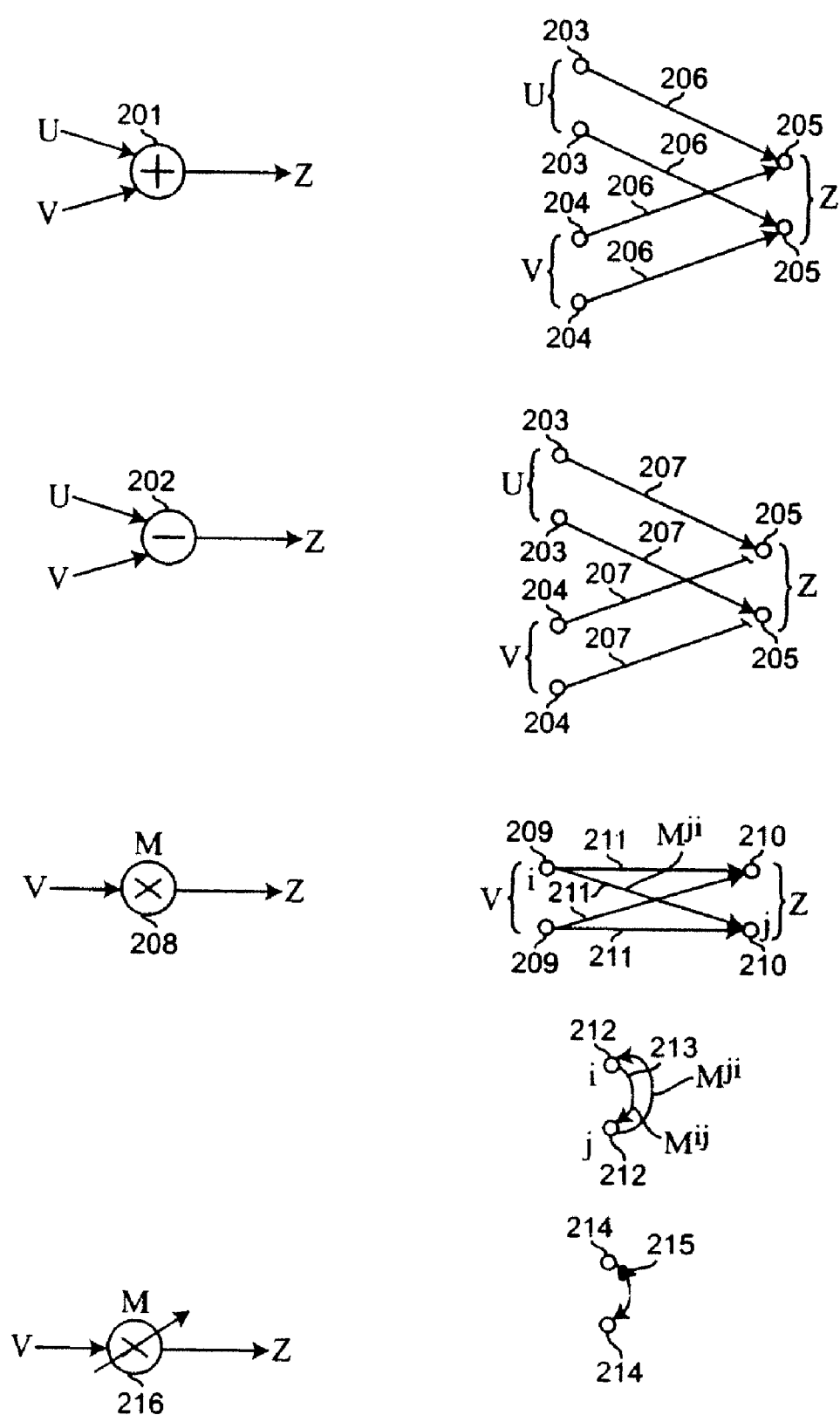
FIG. 2 illustrates several types of circuit elements and the corresponding arrangements of nodes and connections in an ANN.

Each of the operations described above corresponds in the following way to an operation within an ANN. For several of these operations, FIG. 2 shows (at the left) the circuit symbols used in this invention to indicate an operation, and (at the right) the ANN elements that perform that operation. For simplicity, the ANN elements are shown for. the case in which each vector has two components (shown as two nodes in the ANN); it is to be understood that one ANN node is to be used for each component of the vector that is being represented by the activities of the ANN nodes.

8. Addition or subtraction of two vectors (denoted by u and v) to produce a third vector z: Each output node $z^i$ receives connections from the two nodes $u^i$ and $v^i$, and combines the input activities to form the sum $z^i = u^i + v^i$ or difference $z^i = u^i - v^i$. Circuit symbol 201 denotes this operation for addition, and 202 for subtraction. In the ANN representation, nodes 203, 204, and 205 have activities corresponding, respectively, to the components of input vector u, input vector v, and output vector z. A connection 206 joins each of the two input nodes for each vector component to the corresponding output node for that vector component, in the case of addition. Connections 207 join the input nodes to the corresponding output nodes in the case of subtraction. The "T"-shaped termination, instead of an arrow, denotes the vector that is being subtracted (at element 202) or the connection whose activity is being subtracted (at element 207).

9. Multiplication of a vector by a matrix: Each output node $z^j$ receives connections from nodes $v^i$, each connection having strength $M^{ji}$, and the total activity received by each node $z^j$ is the weighted sum $\Sigma_i M^{ji} v^i$. Circuit symbol 208 denotes this operation. There are two ANN representations that correspond to this operation, depending upon whether (a) the nodes whose activities represent the output vector are a different set of nodes from those whose activities represent the input vector, or (b) the same set of nodes at a later time step. (a) In the first case, nodes 209 and 210 have activities corresponding, respectively, to the components of the input vector v and the output vector z. A connection 211 joins each input node to each output node. In general, if there are $n_v$ input nodes and $n_z$ output nodes, the number of connections is the product $n_v n_z$. (b) In the second case (showing "lateral" connections), the output activities z replace the input activities v after a time step or time interval has elapsed. Nodes 212 denote the ANN nodes in this case, and connections 213 the connections from each node to each node. In general, all pairs of nodes may have a connection between them, including self-connections from a node to itself as shown. In practice, unneeded connections (those corresponding to matrix elements that are always zero) may be omitted. The connections may be directed (carrying activity in one direction only) or undirected (carrying activities in both directions). In the undirected case, the connection strengths in both directions are equal; i.e., $M^{ji} = M^{ij}$ for all pairs (i,j). The undirected case is denoted by the double-arrowed connections 215 joining nodes 214.

10. Transformation according to $z^i = g^i(v^i)$: Here $v^i$ denotes the total input activity to node i, and $z^i$ the output activity.

11. Updating of a function $g^i$: The change in the function $g^i$ depends only on information available at that node i; namely, the form of $g^i$ itself, and the activity $v^i$ at that node.

12. Updating of a connection strength matrix M: The change in each connection strength $M^{ji}$ depends only on information available at that connection and at the nodes it connects; namely, the values of $M^{ji}$ itself, and of the activities $v^i$ and $z^j$. Circuit symbol 216 denotes this operation. In an ANN representation, as will be discussed below in connection with FIG. 9, components of the two activity vectors that are used to determine the modification of the connection strengths will be denoted by a double-line joining those components.

13. "Ganging" to update a connection strength matrix: Here all corresponding connections (i.e., from a specified node i to a specified node j, within each set indexed by k) have the same strength $M^{ji}$ for all k. The ANN has a connection from node i to node j within each set k, and has communication means whereby corresponding connections maintain the same strength independent of k, and whereby the change in that common strength $M^{ji}$ (for each pair (i,j)) is determined by a set of contributions, one from each set k, with each contribution (for a given k) being computed using only information available at that connection (from node i to node j within that set k).

An example of the use of ganged connections is as follows. Consider a network in which there are multiple sets of source nodes (i;k) and of target nodes (j;k), wherein each set is designated by the index k and each node within a given set is designated by index i (for source node) or j (for target node). The connection from node i to node j within set k is denoted (j,i;k). At a given time, each such connection (in the absence of ganging) might be modified by an amount proportional to the product of the source and target activities within that group, i.e., $z^j(k)z^i(k)$. As a result of the ganging, the connection strength $M^{ji}$ would be the same for all sets k, and would be modified by an amount proportional to the average of the products of corresponding activities, i.e., $<z^j(k)z^i(k)>_k$ where the angle brackets denote an average over the set index k. Various methods may be used to implement the ganging of connections. In a software implementation of such a network, a simple averaging (as above) may be performed. In a hardware implementation, the communication required to coordinate the behavior of corresponding portions of a network may be accomplished by other means including the precise timing (e.g., synchronization) of activity patterns in different parts of the network. Synchronization of activity patterns (including oscillations) has been described both in biological neural systems and in ANNs used to model aspects of perception and learning. Alternatively, in a hardware implementation, the activity vectors indexed by k may be communicated, one k value at a time, to a single processor complex that comprises the connection matrix M, thereby updating M.

14. Mode switching: The flow or behavior of a set of activity signals or values, constituting an activity vector, is controlled by the mode switch operation. Examples of a change in the flow of activities is described below in relation to FIG. 7.

We define a "neural network equivalent system", or "NNES", to be a system selected from the group consisting of:

15. An ANN implemented in hardware.
16. A software implementation of an ANN, run on a computer.
17. A circuit whose elements implement elementary neural computations.
18. A software program, run on a computer, whose steps implement elementary neural computations.

In the case of a hardware implementation of an ANN, or a circuit, the elementary neural computations may be performed either at discrete times or in a continuous fashion. In the latter case the ANN or circuit is preferably implemented using analog electronic computation means.

Mathematical Preliminaries; Derivation of NNES Equations for Estimation and Control Kalman Estimation We first consider the equations for classical Kalman estimation, Equations 1 to 9. We define the auxiliary matrix $$Z_t = H P_t^- H' + R. \quad (14)$$

Then Equation 6 yields $$(I - H K_t) = R Z_t^-. \quad (15)$$

Using Equations 9 and 15, and defining $\tilde{F} = H F H^{-1}$, we derive $$Z_{t+1} = \tilde{F}(I - R Z_t^{-1}) R \tilde{F}' + H Q H' + R. \quad (16)$$

(Note: If the dimension $N_y$ of a measurement vector y is less than the dimension $N_x$ of a plant state vector x, then H is an $N_y$-by-$N_x$ rectangular vector, and has no inverse. In this case the pseudoinverse $H^+$ should be used as a replacement for $H^{-1}$; the pseudoinverse is a standard generalization of the matrix inverse $H^{-1}$, and is defined as $H^+ = H'(HH')^{-1}$. If one makes this replacement of $H^{-1}$ by $H^+$ in all equations, all of the results remain unchanged.)

Also, the measurement residual (defined above) equals $$\eta_t^- = y_t - H \hat{x}_t^- = H x_t + n_t - H \hat{x}_t^- = H \xi_t^- + n_t, \quad (17)$$

$P_t^- = \mathrm{Cov}(\xi_t^-)$, and $R = \mathrm{Cov}(n_t)$, yielding $$\mathrm{Cov}(\eta_t^-) = H P_t^- H' + R = Z_t. \quad (18)$$

The time evolution of $\eta^-$ is derived using Equations 1, 2, 3, 7, and 15, and is described by $$\eta_{t+1}^- = \tilde{F} R Z_t^{-1} \eta_t^- - \tilde{F} n_t + H m_t + n_{t+1}. \quad (19)$$

One can confirm algebraically that this equation implies $\mathrm{Cov}(\eta_{t+1}^-) = Z_{t+1}$, as it must since Equation 18 holds for all t.

We define the following quantities for later use: the a priori measurement estimate $\hat{y}_t^- = H \hat{x}_t^-$, and the a posteriori measurement estimate $\hat{y}_t = H \hat{x}_t$. Using Equations 3, 4, 7 and 15, we derive $$\hat{y}_t = y_t - R Z_t^{-1} \eta_t^- \quad (20)$$

and $$\hat{y}_{t+1}^- = \tilde{F} \hat{y}_t + H B u_t. \quad (21)$$

Note that the above equations have been expressed in a form that involves measurement estimates $\hat{y}_t^-$ and $\hat{y}_t$, and the matrix $\tilde{F}$, but does not explicitly involve the plant state $x_t$, plant state estimates $\hat{x}^-$ and $\hat{x}$, or the matrices F and H (except through the term (HBu$_t$), which is provided as input to the estimation system). The system performing the estimation does not require, and in general may not have access to, knowledge of either the transformation H that relates plant states to measurements, nor of the plant evolution matrix F that determines how $x_{t+1}$ is related to $x_t$. Only the combination $\tilde{F} = H F H^{-1}$ is required, and that combination is learnable using measurements alone (as shown below in the section entitled "Detailed Example of ANN Implementation of Optimal Kalman Estimation"). Thus, the estimation system learns to produce measurement estimates. If one knows the values of the matrix H, one can derive the corresponding plant state estimates. Similarly, if H is available to the estimation system, the system can be used to generate plant state estimates.

Kalman Control

We now consider the Kalman control equations, Equations 1, 2, and 10 to 13. We define the auxiliary matrix $$T_t = B' S_t B + g. \quad (22)$$

Then Equation 11 yields $$I - B'(F')^{-1} L'_t = g T_t^{-1}. \quad (23)$$

Using Equations 12 and 23, and defining $\hat{F} = B^{-1} F B$, we derive $$T_{t-1} = \hat{F}' g (I - T_t^{-1} g) \hat{F} + B' r B + g. \quad (24)$$

(Similarly to the note regarding $H^{-1}$ above, if the dimension $N_u$ of a control vector u is less than $N_x$, then B is an $N_x$-by-$N_u$ rectangular matrix, and $B^{-1}$ should be replaced throughout by the pseudo-inverse $B^+ = (B'B)^{-1} B'$). Now we introduce new vectors $w_t$, $v_t^r$, and $v_t^g$ at each time step. The vector $v_t^r$ is defined to be randomly drawn from a distribution having mean zero and covariance r; similarly, $v_t^g$ is defined to be randomly drawn from a distribution having mean zero and covariance g. Each vector is drawn independently of the other one, and independently of the random drawings at all other time steps. Each of these vectors may be regarded as an artificially generated "noise" term, not arising from the plant or the measurement process, but added for the purpose of the computational process.

The vector $w_t$ is initialized (at time t=N) as $w_N = v_N^g$, and is defined to change in the following way as the time index t is decremented:

$$w_{t-1} = \hat{F}'(g T_t^{-1} w_t - v_t^g) + B' v_t^r + v_{t-1}^g. \quad (25)$$

Equation 25 and the initialization of w have been so constructed that, for all times t, $$T_t = \mathrm{Cov}(w_t). \quad (26)$$

To derive this, note that Equation 25 implies $E[w_t(v^g)'_t] = E[v_t^g(v^g)'_t] = g$; then use Equation 25 to express $\mathrm{Cov}(w_{t-1})$ in terms of $\mathrm{Cov}(w_t)$. If it is true that $\mathrm{Cov}(w_t) = T_t$, then algebraic manipulation leads to the result $\text{Cov}(w_{t-1})=T_{t-1}$. Since the initialization ensures that Equation 26 holds for $t=N$, and since the equation holds for $t-1$. whenever it holds for $t$, it follows by mathematical induction that the equation holds for all $t \leq N$.

The important result of this section is that, for both Kalman estimation and control, we have constructed a vector ($\eta_t^-$ for estimation, $w_t$ for control), such that the covariance of that vector at each $t$ equals a matrix ($Z_t$ for estimation, $T_t$ for control), and such that the evolution of that vector (from $t$ to $t+1$ for estimation, from $t$ to $t-1$ for control) yields the Kalman matrices ($K_t$ for estimation, $L_t$ for control) at each time step $t$.

NNES Implementation of a More General Class of Matrix Equations

The construction described above can be extended more generally, beyond the cases of Kalman estimation and control, as follows. In a variety of applications it is necessary to compute, for each of a plurality of iteration index values $t$, a new matrix $M_{t+1}$, given a matrix $M_t$, where $M_{t+1}=h(M_t)$ and $h$ is a specified function. In cases for which the following construction can be performed, this construction enables the M matrix computation to be performed by an NNES.

Specify a method for choosing a plurality of activity vectors $v_t(k)$, indexed by a second index $k$. For example, each $v_t(k)$ may be drawn at random in accordance with a specified probability distribution function. Specify a functional relationship between a connection strength matrix $\hat{M}_{t+1}$ and the set of vectors $\{v_t(k)\}$: $\hat{M}_{t+1}=f(\{v_t(k)\},\hat{M}_t)$, where the function $f$ can be implemented, by neural computations, as a learning rule for the matrix of strengths M. The notation indicates that $\hat{M}_{t+1}$ is a function of the previous set of strengths $\hat{M}_t$ and the set of vectors $v_t(k)$ that is indexed by $k$. Specify also an evolution equation of the form $v_{t+1}(k)=g(v_t(k),\hat{M}_t)$, where the function g can be implemented using neural computations. Choose g such that the matrix $\hat{M}_{t+1}$, thus computed, is approximately equal to $h(\hat{M}_t)$, where the approximation improves as the number of vectors $v_t(k)$ (at each t) is increased. When this property is satisfied, and $\hat{M}$ is suitably initialized to equal or approximate the original matrix M, then the iterative process of neural computations will determine the evolution of the matrix $\hat{M}_t$ and the set of vectors $v_t(k)$ at a succession of iteration index values t, and $\hat{M}_t$ will continue to approximate the matrix $M_t$ whose computation was required. To summarize, when the iteration index equals t, $\hat{M}_t$ and $\{v_t(k)\}$ determine $\hat{M}_{t+1}$ via function $f$, and they determine $\{v_{t+1}(k)\}$ via function g; then the iteration is repeated for iteration index $t+1$. Thereby the result of a set of neural computations will be to carry out the desired computation of the matrix $M_t$ to the required degree of approximation.

As an important special case of this more general formulation, we consider the algebraic Riccati equation $$X_{t+1}=A'X_tA+Q-A'X_tB(B'X_tB+R)^{-1}B'X_tA. \quad (27)$$

Both the Kalman estimation and Kalman control problems have equations of this form. To perform this iterative computation using a NNES, we define $M_t \equiv B'X_tB+R$, and also define for notational convenience $\hat{A}=B^{-1}AB$. Then the X equation yields an equation for the evolution of M:

$$M_{t+1}=h(M_t)\equiv R+B'QB+\hat{A}'(I-RM_t^{-1})R\hat{A}, \quad (28)$$

which is the equation to be solved. To do this using an NNES, we specify the activity vector evolution equation to be:

$$v_{t+1}(k)=g(v_t(k),\hat{M}_t)\equiv \hat{A}'[-n_t(k)+R\hat{M}_t^{-1}v_t(k)]+B'm_t(k)+n_{t+1}(k), \quad (29)$$

where $n_t(k)$ and $m_t(k)$ are random vectors, each independently drawn from a distribution having a mean of zero and the covariance matrix R (for n) or Q (for m) respectively. We specify the function $f$ to be the function $$\hat{M}_{t+1}=f(\{v_t(k)\},\hat{M}_t)\equiv <v_t(k)v_t'(k)>, \quad (30)$$

where the angle brackets denote the mean over k. Thus $\hat{M}_{t+1}$ approximates $\text{Cov}(v_t)$, with the approximation improving as the number of vectors indexed by k is increased. Algebraic computation of $\text{Cov}(v_{t+1})$, using Equation 29 and the fact that $E(v_tn_t')=E(n_tn_t',t)=R$, yields the same equation as Equation 28, but with $\hat{M}$ replacing M. Therefore, an NNES that implements Equation 29 and the batch learning method of Equation 30, or a related incremental learning method, as discussed in the next section, will solve the Riccati Equation 28.

Updating a Covariance Matrix or Inverse Covariance Matrix: Neural Network Methods A key step in implementing estimation and/or control, using neural computations, is that of computing and updating the inverse of a covariance matrix. As shown above (see Equation 19 for estimation, or Equation 25 for control), we have constructed a vector ($\eta_t^-$ for estimation, $w_t$ for control) whose covariance matrix inverse ($Z_t^{-1}$ for estimation, $T_t^{-1}$ for control) is involved in the computation of the corresponding vector at the next value of the time index ($t+1$ for estimation, $t-1$ for control). In this section we describe several methods for learning and updating a matrix that is a sufficiently good approximation to a covariance matrix inverse, by means of a neural network equivalent system (NNES).

A covariance matrix is, by definition, the expectation value of the product of a vector and its transpose; for example, $M \equiv \text{Cov}(v) \equiv E(vv')$, where the mean value $E(v)$ of v is zero. The expectation value $E(\ldots)$ refers to an average over a distribution of vectors. In the NNES methods discussed here, only a finite number of instances, denoted by $v(k)$, of the vector v are available. If all such instances are drawn from (that is, generated according to) the same distribution, then the covariance matrix is approximated by $<v(k)v'(k)>$, where $<\ldots>$ denotes an average over k. If, on the other hand, the distribution is changing as the instances are generated, then the covariance matrix may be approximated by a running average over k in which, as each new $v(k)$ is generated, the product term $v(k)v'(k)$ is combined with a previous approximation of the covariance matrix. For example, $$M(k)=(1-a)M(k-1)+av(k)v'(k) \quad (31)$$

where $M(k)$ denotes the running average through the k term, and a is a "learning rate" having a value between zero and one, which may either be kept constant or may be specified to vary with k (see "Use of Adjustable Learning Rates" below). Such a running average provides a sufficiently good approximation provided that the distribution is changing slowly enough.

Incremental Learning Methods

In order to use an ANN to compute an approximation to the inverse $M^{-1}$ of a covariance matrix M, we first consider methods in which a running average is used, and refer to these as "incremental learning" methods. In one such method ("incremental covariance learning"), a set of connection strengths in an ANN corresponds to the values of a matrix $D(k)$ that is simply related to $M(k)$ according to $D(k)=I-cM(k)$, where $M(k)$ approximates the covariance matrix M. The product $M(k)^{-1}v$, which is used in the present invention, is then generated by neural computations as will be shown. In a second such method ("incremental inverse covariance learning"), a set of connection strengths in an ANN corresponds to the values of a matrix M, which approximates the covariance matrix inverse $M^{-1}$; and the product M(k)v is then generated by neural computations.

Incremental covariance learning: This method is described in R. Linsker, *Neural Computation,* vol. 4 (1992), pp. 691-702, especially at pp. 694 and 700-701. The matrix D(k) is computed in a manner similar to the running average M(k) described above. The components of input vector v(k) correspond to the activities at the inputs of a set of nodes, at a time corresponding to index k. These nodes are interconnected by a set of lateral connections. Just prior to the kth update step, the lateral connection from node i to node j has strength $M^{ji}(k-1)$. At the kth update step, the strengths are updated according to D(k)=aI+(1-a)D(k-1)-acv(k)v'(k), which is derived from Equation 31. Then a series of substeps is carried out. (The index k will be omitted here for notational simplicity.) The input activity vector v to the nodes is held constant. At the first substep, this input v is passed through the lateral connections, so that v is thereby multiplied by the connection strength matrix D, and is fed back as input to the same set of nodes. Thus the activity vector after the first substep is $z_1=v+Dv$. At the second substep, this activity $z_1$ is again multiplied by D, and added to the constant input v, so that the resulting activity vector is $z_2=v+Dz_1=v+Dv+D^2v$ where $D^2$ denotes the square of the matrix D. Iteratively repeating this process, after the nth substep, the activity vector is $$z_n = v+Dv+D^2v+\ldots+D^nv = (I+D+D^2+\ldots+D^n)v, \quad (32)$$

where the superscripts denote powers of D. For a suitable choice of the constant c (as described in the above-cited reference), this series converges to $(I-D)^{-1}v$, which equals $(1/c)M(k)^{-1}v$. A finite number of iterations converges to a sufficiently good approximation to this asymptotic result. Thus the goal of computing an output activity $M(k)^{-1}v$ by neural computations is accomplished.

Incremental covariance inverse learning: This method is described in R. Linsker, *Neural Networks,* vol. 18 (2005), pp. 261-265. It is based on the classic Sherman-Woodbury-Morrison matrix identity, and the neural learning rule has the form $$\tilde{M}(k+1)=(1+a)\tilde{M}(k)-az(k)z'(k) \quad (33)$$

where z(k)=M(k)v(k). To implement this in a neural network, M is represented by the strengths of an undirected set of lateral connections. The input activity vector v(k) is passed through the matrix of connections, yielding the activity vector M(k)v(k). Then an anti-Hebbian learning rule is used [it is called "anti-Hebbian" because of the minus sign on the last term, -az(k)z'(k)] to update the strengths M. Because the lateral connections are undirected, M(k) is a symmetric matrix. This is useful for technical reasons as described in the above-cited reference. Since M(k) provides an approximation to $M^{-1}$, the output activity vector M(k)v(k) approximates $M^{-1}v$, as desired.

Batch Learning Methods

We next consider a method in which a set of instances v(k) of the vector v are available at a given time t, and can be used to update the matrix $D_t=I-cM_t$ (as defined above, in the paragraph on "incremental covariance learning") to a new value $D_{tnew}$. This method is suitable for use with neural network equivalent systems in which the "ganging" operation described above is available. In this case, there is a separate set of nodes for each value of the index k. The input activity to node i of set k is $v^i(k)$. The lateral connection strength from node i to node j within each set k is $D^{ji}$, and is independent of k.

In one method, which we call "replacement batch learning", a new matrix of strengths $D_{tnew}$ is computed at each time step, according to $D_{tnew}=I-c<v(k)v'(k)>$ or, equivalently, $D_{tnew}=<[I-cv(k)v'(k)]>$, where the angle brackets denote an average over k and the "ganging" operation is used. Thus, $D_{tnew}$ is directly computed as an approximation of the identity matrix I minus a constant c times the covariance matrix of v. The approximation improves as the number of instances k is increased. Using this connection strength matrix, the quantity $M^{-1}v(k)$ is obtained by applying the input activity vector v(k) to the kth set of nodes, and iteratively passing the activities through the lateral connections D multiple times, as described above in the paragraph on "incremental covariance learning".

In a variant, which we call "blended batch learning", $D_{tnew}$ is computed by combining the previous matrix $D_t$ with the new quantity computed above, so that the updated matrix is intermediate between the $D_{tnew}$ of "replacement batch learning" and $D_t$. For example, one may define $D_{tnew}=(1-a)D_t+a<[I-cv(k)v'(k)]>$. This method is useful when the number of sets k is insufficient to provide a sufficiently good approximation of I-cM (where M is the covariance matrix), so that a running average over successive times is desirable.

Use of Adjustable Learning Rates

Equation 31 above, and learning rules to be discussed (see, e.g., Equations 35 and 38 below), involve numerical factors called learning rates (a, $\gamma_Z$, and $\gamma_F$ in the referenced equations). These can be taken to be constant, as is done to obtain the results illustrated in the section entitled "Numerical Results" below. However, they can also be usefully adjusted during the learning process. Two purposes of this adjustment are to speed up the learning process, and to decrease the random fluctuations that occur in the weight matrices being learned.

Consider FIG. 12 as an example. When one or more components of the matrix being learned has a value far from its final value (see, e.g., FIG. 12A), the approach of that value to its final value is approximately linear. If the appropriate learning rate (in this case, $\gamma_Z$) is increased, the slope of this approximately linear approach will also be increased in magnitude, resulting in a faster approach to the vicinity of the final value. On the other hand, once the learned value is in the vicinity of its final value, it is desirable to decrease the value of the appropriate learning rate, in order to reduce the random fluctuations of the learned value about its correct value. The adjustments in the learning rate(s) can be specified explicitly, or can be made automatically. One way to make the adjustments automatically is to compare the size of the fluctuations in learned values, to the slope of the trend in those values. If the learned value is changing approximately linearly with time and fluctuations about this linear trend are relatively small, the learning rate should be kept relatively large or increased. Conversely, if fluctuations dominate the change in learned values, the learning rate should be kept relatively small or decreased.

Population Averaging and "Ganging" of Connections

In the section entitled "Definitions of Terms Relating to ANNs" above, and in the section above on "Batch Learning Methods", a neural computation involving the "ganging" of connections was described and used. An example of the utility of this operation in an estimation and/or control process is as follows. In contrast to incremental learning methods that use only one vector at a time to update a covariance matrix or a covariance matrix inverse, the learning process can be performed more rapidly by using a plurality of values of the measurement residual vector at each time step. For example, if the task is to estimate the position of an object as a function of time, and the object has a plurality of identified features (e.g., visible markings) that are each tracked over time, then a separate measurement can be made of the position of each feature at each time step, and the measurement residual vector $\eta_t^-$ an be computed for each such feature. Then one can use this ensemble of measurement residual vectors to compute an approximation, $Z_t$, of the covariance matrix of $\eta_t^-$. This computation will be more accurate than that obtained by combining only a single value of the measurement residual vector with the computation of $Z_{t-1}$, from the previous time step. Since the simultaneous computation for each feature will in general require a set of neurons devoted to representing the signals obtained for each feature, the total number of required neurons will in general be increased, but this can be justified by the resulting speedup of the learning of the filter $Z_t$. In a software implementation of an NNES, this use of "ganging" or population averaging is well-suited to parallel computing methods. In a hardware implementation using a neural network or other special-purpose circuitry, economies of scale as well as increased speed can be realized by constructing a large number of sets of processors that, in parallel, process distinct parts of an input environment (e.g., a visual field) for estimation purposes, or generate and process independent vectors used in the learning of a control function (as described below), and combine the results of their computations in order to perform batch learning of a covariance matrix or covariance matrix inverse.

NNES Circuit for Estimation

Figure 3:
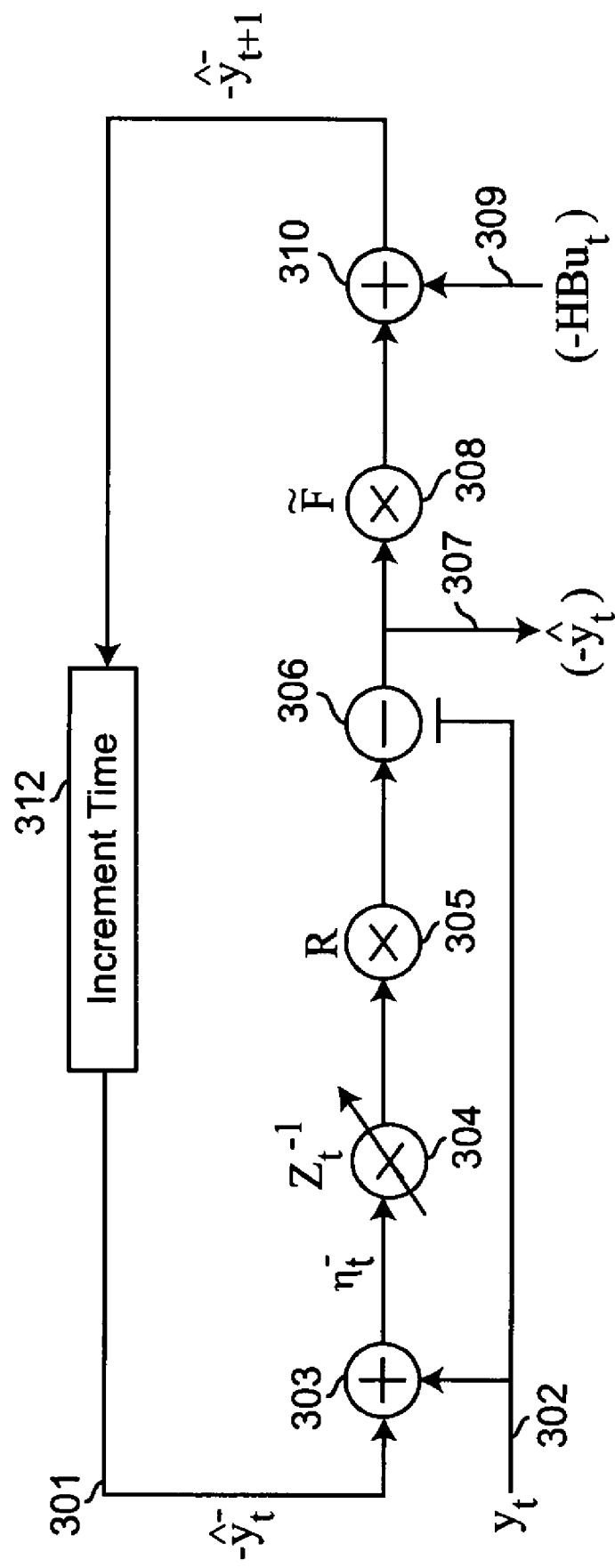
FIG. 3 illustrates a circuit and data flow for performing an estimation process and for learning an optimal estimation function.

FIG. 3 is a circuit showing the data flow in an embodiment of a neural network equivalent system for performing Kalman estimation. The circuit may be implemented in the form of special-purpose hardware or as a software program running on a general-purpose computer. If implemented as hardware, the circuit may be constructed from units that perform vector addition, multiplication of a vector by a matrix, and the other functions described above in the section entitled "Definition of Terms Relating to ANNs", or the circuit may be implemented as a hardware ANN with nodes and connections as also described above.

The circuit of FIG. 3 operates as follows. The vector denoted $(-\hat{y}_t^-)$, which is the a priori measurement estimate at time t, is carried by line 301. The measurement vector at time t, denoted $y_t$, is provided as input to the circuit by line 302. At element 303, $y_t$ is added to $(-\hat{y}_t^-)$ to yield $\eta_t^- = y_t - \hat{y}_t^-$. This vector is multiplied by the matrix $Z_t^{-1}$ at element 304. Also at element 304, a matrix updating process is carried out using one of the methods described above, in the section entitled "Updating a Covariance Matrix or Inverse Covariance Matrix: Neural Network Methods". In this manner, the values of either the matrix $(I-cZ_t)$ or $Z_t^{-1}$ are updated (depending upon which matrix is being stored for use at the next time step, as discussed in the previous section), using the input $\eta_t^-$ at element 304 to yield. the new matrix $(I-cZ_{t+1})$ or $Z_{t+1}^{-1}$ respectively. The new matrix is stored for use by block 304 at the next time step t+1. The output of block 304 is then multiplied by R at block 305, to yield output $(RZ_t^{-1}\eta_t^-)$. At block 306 the measurement input from line 302 is subtracted from the output of block 305. The output of block 306 is provided as the output vector from the circuit. This vector equals the negative of the a posteriori measurement estimate, $(-\hat{y}_t)$, by virtue of Equation 20 above.

The quantity $(-\hat{y}_t)$ is also passed as input to element 308, where it is multiplied by the matrix F. The result is added, at element 310, to the vector denoted $(-HBu_t)$ that is provided as input on line 309. The result, on line 311, is $(-\hat{y}_{t+1}^-)$, which is the negative of the a priori measurement estimate at time t+1. This result is provided as input to time delay element 312, where the time step is incremented by one unit. Accordingly, the time step designated as t+1 at the input to element 312 is designated as t at the output from that element. The cycle then repeats for the new time step.

NNES Circuit for Control

Figure 4:
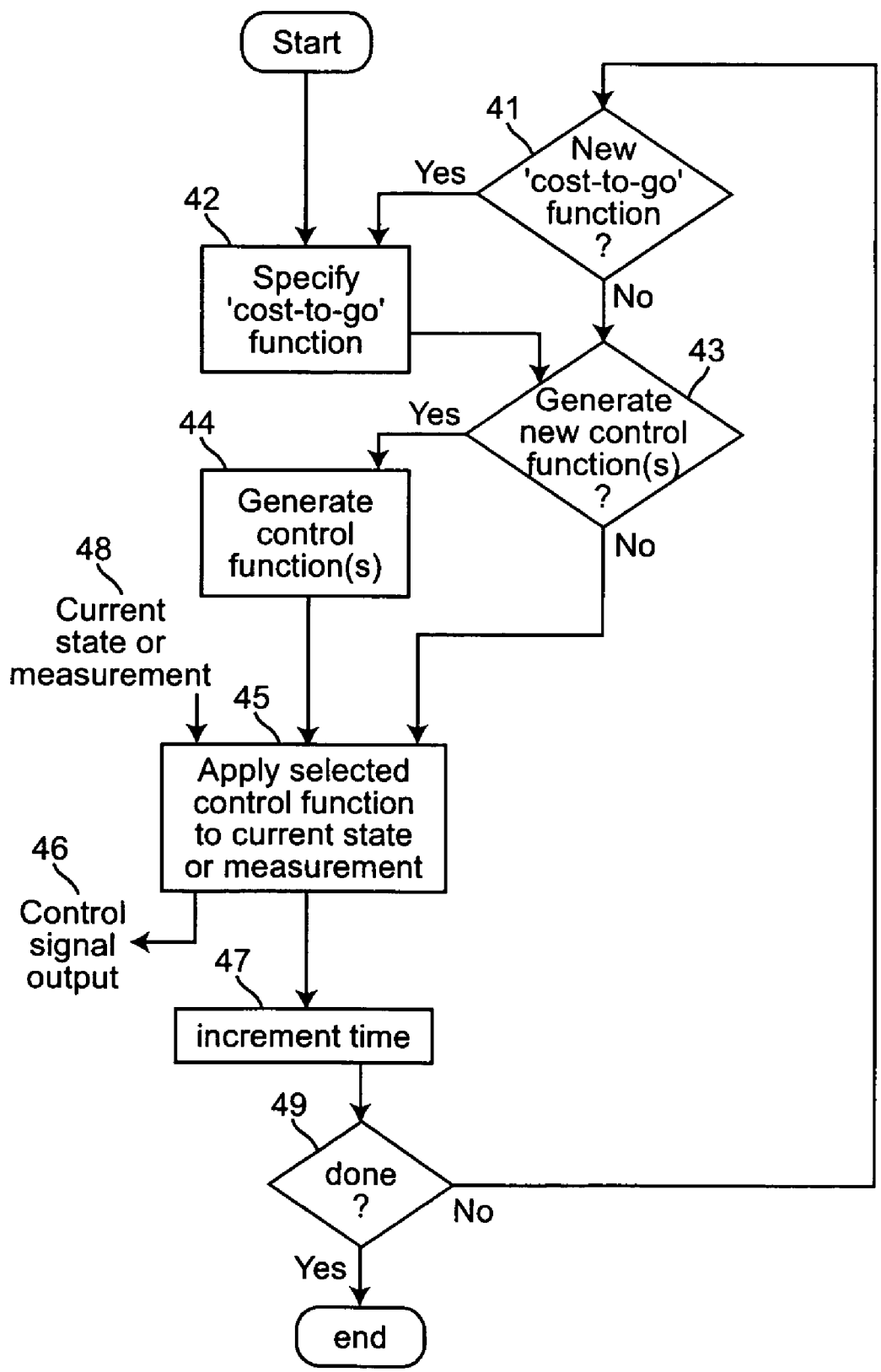
FIG. 4 is a flow diagram showing the main elements of a system that learns and executes a control function.

FIG. 4 illustrates the general control process. At step 41 it is determined whether a new cost-to-go function is to be provided. (The first time through the process, such a function must be provided. Thereafter, a new cost-to-go function may be provided when, e.g., the target state to be reached or approached changes, or when the nature of any of the contributing costs has changed.) If the answer is "yes", then the new cost-to-go function is specified at step 42. At step 43 it is determined whether at least one new control function is to be generated. If the answer is "yes", or if the process loop is being executed for the first time, then the new control function (s) is generated at step 44.

At step 45, a selected control function is applied to the current plant state or measurement vector 48. Note that a possible reason for generating more than one control function at step 44, is so that a different one of the generated functions can be selected at step 45 during each of several different time steps, without having to re-enter step 44 at each new time step. Each such control function takes as an input the current plant state or measurement vector, and generates as an output a control output signal vector. (A "vector" here denotes simply a set of one or more numerical values.)

The control output signal vector 46 is provided as output to the external plant, whereby it influences the future plant state, and is also optionally provided as output to other parts of the system, where it can be used, e.g., to influence the estimation of the plant state or the computation of a measurement estimate as described above. The time is then incremented at step 47 and if the control process is not yet completed (step 49), the process loop continues with step 41.

A particular, and important, special case of the control problem is that of optimal Kalman control, or the "linear quadratic Gaussian" control problem. This case is discussed below. Note that, in general, the matrix quantities discussed below that are for notational convenience and simplicity taken to be constant in time, may instead vary with time in a specified way. In this fashion, certain nonlinear processes can be modeled and an approximation to optimal control can be realized. (This modification is analogous to the "extended Kalman filter" formulation of the estimation problem, discussed above.)

Learning of the Optimal Control Function

Figure 5:
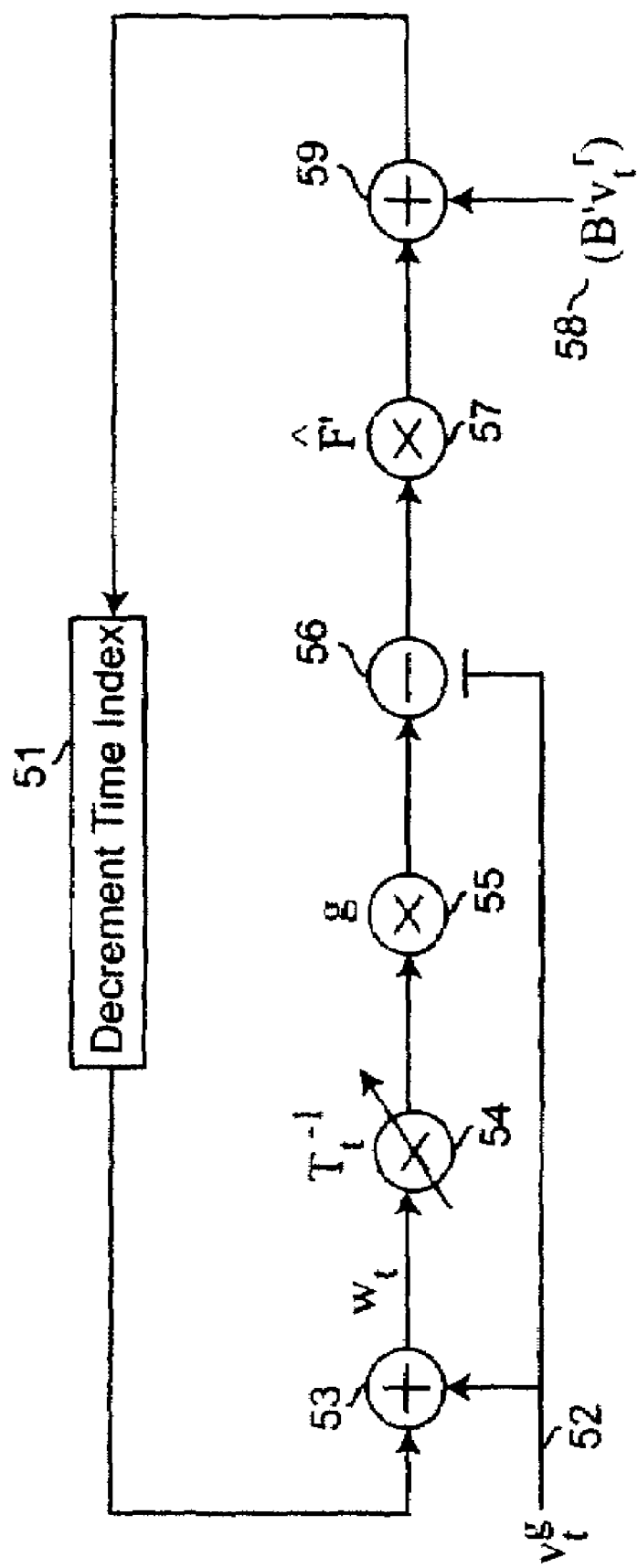
FIG. 5 illustrates a circuit and data flow for learning an optimal control function.

FIG. 5 shows a circuit for the learning of an optimal, or approximately optimal, control function. We first describe the flow process loop, starting arbitrarily at block 51. (The initialization of the process will be discussed later.) At element 51 the time index is decreased by one unit, so that if the loop that has just been completed corresponded to, e.g., a time index of t=5, the next loop will have time index t=4. A random vector $v_t^g$ is generated and passed along line 52, to elements 53 and 56. At element 53 this vector is added to the result vector from the previous loop. The sum is equal to $w_t$, the vector described by Equation 25. At element 54 two events occur. First, the input to that step, $w_t$, is multiplied by the current value of $T_t^{-1}$, the inverse of the matrix $T_t$, which is described by Equations 24 and 26. Second, the current value of $T_t^{-1}$ is updated to produce the value $T_{t-1}^{-1}$ that will be used at the next execution of the loop (after the time index t has been decremented). For a description of several methods that may be used to accomplish both the updating of $T^{-1}$ and the multiplication of $w_t$ by $T^{-1}$, see the section above entitled "Updating a Covariance Matrix or Inverse Covariance Matrix: Neural Network Methods".

At element 55 the input vector to this block is multiplied by the matrix g. At element 56 the random vector $v_t^g$ is subtracted from the output of element 55. The output of element 56 is the vector $(gT_t^{-1}w_t-v_t^g)$. At element 57 this vector is multiplied by the matrix $\hat{F}'$. At element 58 a random vector is computed by first drawing a random vector $v_t^r$ from a distribution having zero mean and covariance matrix equal to r, and then multiplying this vector by the matrix B'. Alternatively, the vector denoted $B'v_t^r$ may be generated as a random vector drawn from a distribution having zero mean and covariance matrix equal to B'rB. At element 59 the outputs of element 57 and element 58 are added. The resulting vector is $\hat{F}'(gT_t^{-1}w_t-v_t^g)+B'v_t^r$. This vector is provided as input to element 51, at which point the time index is decremented by one. It is therefore seen that the vector w on the next execution of the loop, which is $w_{t-1}$, is equal to the vector provided as input to block 51, plus the new random vector $v_{t-1}^g$. The resulting expression for $w_{t-1}$ is identical to that given by Equation 25, showing that the circuit carries out the computation of $w_{t-1}$ as specified by that equation.

Initialization and termination of the loop: The flow may be initialized by starting at any of several blocks, preferably by specifying an arbitrary vector $w_N$ (or a set $\{w_N(k)\}$ of such vectors, as described below) at time index t=N, and then either (a) using that vector or vectors to compute $T_N^{-1}$ as will be discussed, or (b) specifying an arbitrary symmetric positive-definite matrix $T_N$ or $T_N^{-1}$ to be used for the multiplication at element 54. The loop for t=N then proceeds from that point. The loop can then be terminated after $T_{tcurr}$ has been computed at time index t=tcurr.

Executing Control; Computing the Control Output Vector

The optimal control vector is given by $u_t=-L_tx_t$. Combining Equation 23 with the definition of $\hat{F}$ yields $$L_t=(I-T_t^{-1}g)\hat{F}B-1. \tag{34}$$

Figure 6:
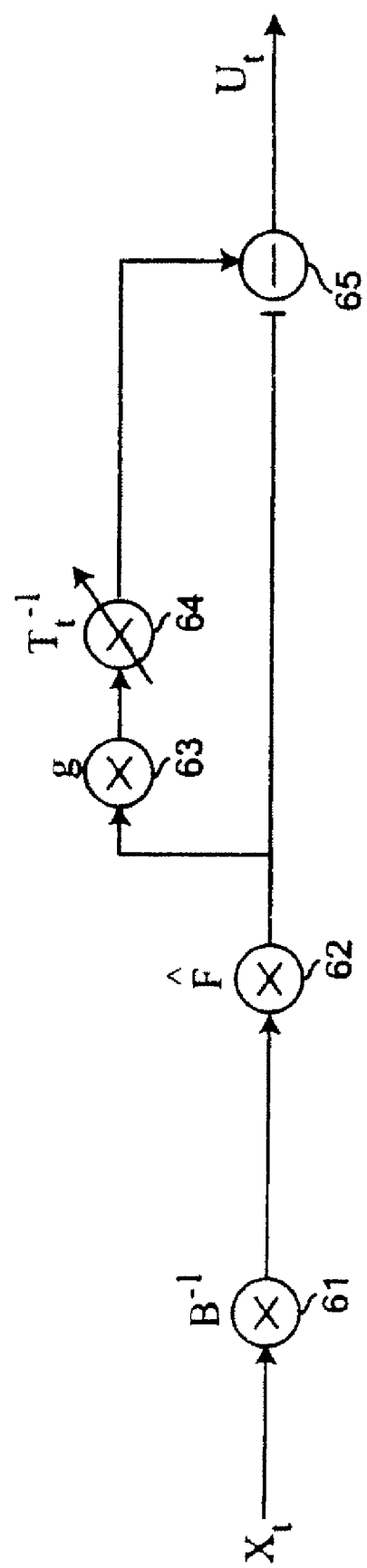
FIG. 6 illustrates a circuit and data flow for calculating a control output signal given a learned control function.

A circuit that computes $u_t$ is given in FIG. 6. The plant state vector $x_t$ is provided as input to the circuit at time t. At element 61, $x_t$ is multiplied by the matrix $B^{-1}$. The resulting vector is first multiplied by the matrix $\hat{F}$ (element 62), then by matrix g (element 63), then by matrix $T_t^{-1}$ (element 64). The modifiable matrix $T_t^{-1}$ is the same matrix that was computed during the learning process, and stored either in the form $T_t^{-1}$ or as $(I-cT_t)$, as described above. At element 65, the sum $(T_t^{-1}g-I)(\hat{F}B^{-1}x_t)$ is computed. This expression is equal to the desired optimal control output $u_t$, as may be seen by comparing it with Equation 34.

The control output $u_t$ influences the plant state $x_{t+1}$ according to Equation 1. Note that $u_t$ is multiplied by matrix B to yield its contribution to $x_{t+1}$. This transformation of the control signal into the effect $Bu_t$ on the plant typically occurs as a result of the physical interaction between the control output signal and the plant. If, in addition, physical means are provided to transform the plant vector $x_t$ into the vector $\tilde{x}_t=B^{-1}x_t$, then block 61 may be omitted, and the input $x_t$ replaced by $\tilde{x}_t$.

Also, in certain cases it may be desirable to simplify the circuit of FIG. 5 by eliminating element 55 (multiplication by matrix g). This can be done as follows. Since g is a symmetric and positive-definite matrix, it can be written in the form $g=\Lambda'\Lambda$ (called a Cholesky decomposition; see, e.g., *Numerical Recipes in C*, W. H. Press et al., (Cambridge Univ. Press, 2nd ed., 1992), p. 96. If one replaces vector u by $\Lambda u$, matrix B by $B\Lambda^{-1}$, and matrix g by the identity matrix I, then the equations for the cost-to-go and for the dynamics are both unchanged. If these replacements are made, then element 55 is eliminated from FIG. 5, and element 63 is eliminated from FIG. 6.

Combined Learning and Execution of Control

Figure 7:
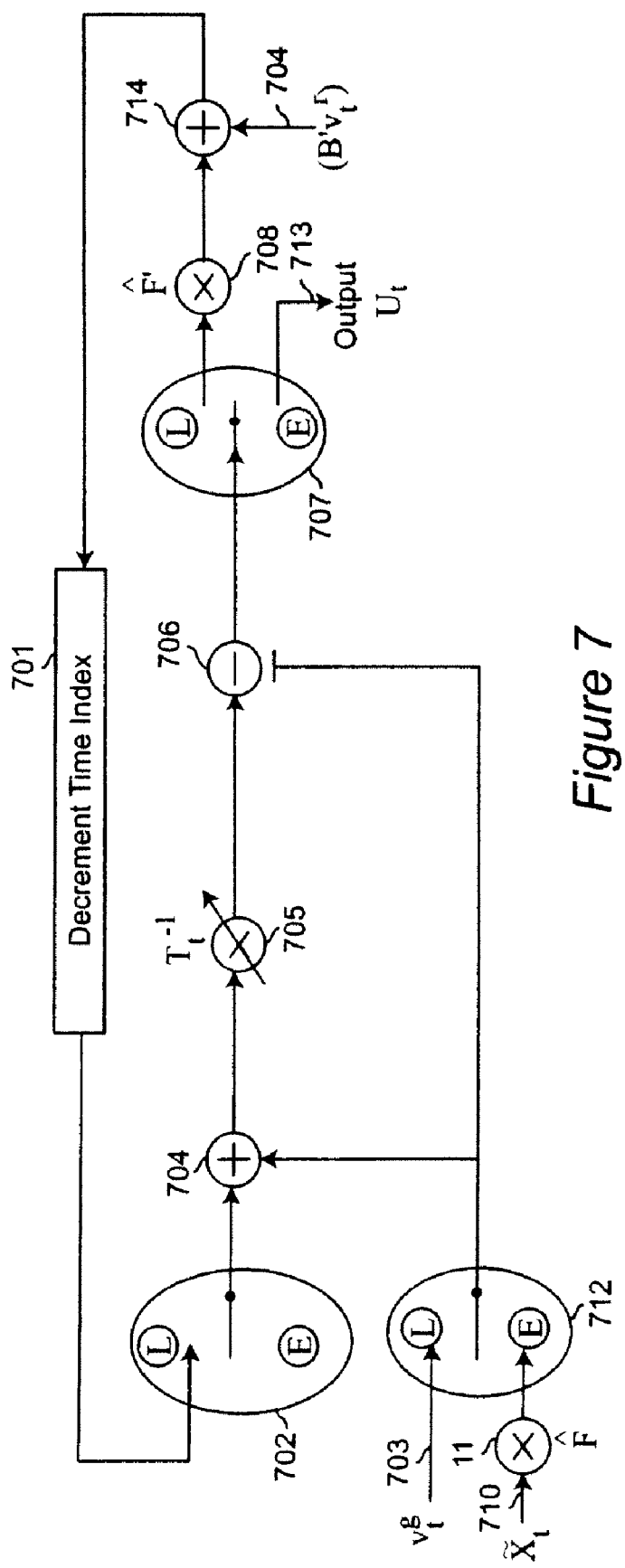
FIG. 7 illustrates a circuit and data flow that combines the functions of learning and executing a control function.

With the above simplifications having been made, FIG. 7 illustrates a combined circuit that performs both the learning function of the circuit of FIG. 5, and the execution function of the circuit of FIG. 6. The circuit operates in either of two modes, called "learning" (L) and "execution" (E) mode. During L mode, the time index starts at t=N and is decremented by one unit at block 701 each time a loop is completed, until the loop terminates at t=tcurr. During E mode, input $\tilde{x}_t$ (see above) is applied to the circuit at time step t=tcurr, and output $u_t$ is generated. After one time step has passed, the new tcurr has been advanced by one, and (in E mode) the corresponding input is applied and output is generated in turn. The mode is switched to L whenever a new control matrix needs to be computed; as noted above, this can be done every time tcurr advances by one, or an already-computed control matrix may be used (in the case that read-out and storage means are provided to preserve the values of the control matrix or matrices for values of the time index t>tcurr). The matrix being learned and stored in this circuit, as connection strengths in a neural network implementation, is either $(I-cT_t)$ or $(T_t)^{-1}$, as described above; the quantity being used to compute either the next iteration (during L mode) or the control output vector $u_t$ (in E mode) is $(T_t)^{-1}$, at element 75.

During L mode, the "double-pole, triple-throw" switch (whose throws are shown as elements 702, 707, and 712) is set to the "up" position, marked "L". The flow of signals through the circuit in L mode is as follows. At element 701 the time index is decremented by one. Output from that element passes through switch 702, and a random vector $v_t^g$ generated at element 703 passes through switch 712. These two vector quantities are added together at element 704. The result is multiplied by $T_t^{-1}$ at element 705. The values of the matrix $(I-cT_t)$ or $T_t^{-1}$ (depending on the implementation choice, described above in the section entitled "Updating a Covariance Matrix or Inverse Covariance Matrix: Neural Network Methods") are also updated at element 705. The same random vector $v_t^g$ that was generated at element 703 is subtracted from the output of element 705. The result passes through switch 707, then is multiplied by $\hat{F}'$ at element 708. A random vector $B'v_t^r$ is generated at element 709, and the outputs from elements 708 and 709 are added at element 714. The result is then passed to the time-decrementing element 701. This entire sequence is the same as that already described for FIG. 5, with the proviso that the matrix g has been eliminated (i.e., transformed into the identity matrix) as described above.

During E mode, the triple-throw switch is in the "down" position (marked "E"). The flow of signals through the circuit during this mode is as follows. Input $\tilde{x}_t$ from element 710 is multiplied by $\hat{F}$ at element 711, passes through switch 712, and is applied as input to elements 704 and 706. There is no other input to element 704 in this mode. The output from element 704 is multiplied by $T_t^{-1}$ at element 705 (no learning or modification is performed at this block during E mode).

The output of element 712 is subtracted from the output of element 705 at element 706. The result passes through switch 707 and is provided as the output control signal $u_t$ at element 713.

Combined Estimation and Control

The above description of the control system considered, for simplicity, the situation in which the plant state was fully observable, so that the plant state $x_t$ (or $\tilde{x}_t$) was used as input to the controller. However, in a more general situation $x_t$ is not itself directly known, but an estimate $\tilde{x}_t$ of it, or an estimation method such as that described earlier in this specification, is used to provide a measurement estimate $\hat{y}_t$.

In the latter case the input to the control circuit is determined by a pre-processing step, in which $\hat{y}_t$ is multiplied by $H^{-1}$ (see Equation 2) to obtain $\hat{x}_t$, and the estimate $\hat{x}_t$ is then used in lieu of $x_t$ in the control circuit. Alternatively, $\hat{y}_t$ is multiplied by $B^{-1}H^{-1}$ to obtain the quantity that is then used in lieu of $\tilde{x}_t$ in the control circuit.

Figure 8:
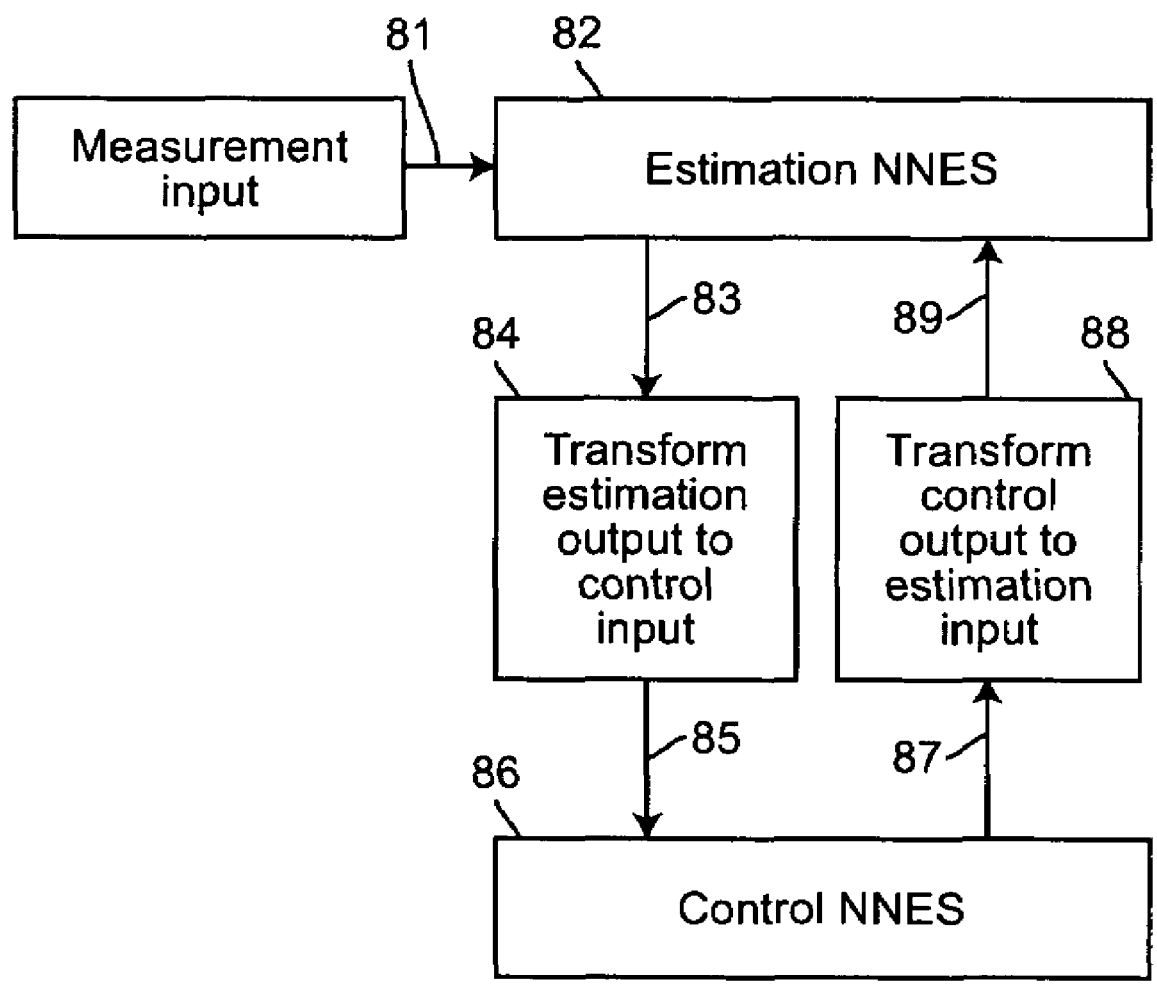
FIG. 8 is a block diagram that illustrates the combination of estimation and control processes within a single system.

FIG. 8 is a block diagram for combined optimal estimation and control. Block 82 performs an estimation process in which at least the learning step, and preferably the entire process, is performed by a neural network equivalent system. A preferred embodiment of this block is the circuit described by FIG. 3. Block 86 performs a control process in which at least the learning step is performed by a neural network equivalent system. A preferred embodiment of this block is the circuit described by FIG. 7.

Measurement input is provided as input on line 81, to the estimation block 82. The output of that block, on line 83, provides information about the measurement estimate provided by block 82. This output is transformed by block 84 to provide input, on line 85, to control block 86. The output of the control block, on line 87, provides information about the control signal generated by that block. This output is transformed by block 88 to provide input, on line 89, to measurement block 82. The entire cycle is repeated at a next time step.

In the case that FIGS. 3 and 7 are used as embodiments of blocks 82 and 86 respectively, the vectors being transmitted and the transformations being performed in FIG. 8 are as follows: The measurement vector $y_t$ is provided as input on line 81. The negative of the "a posteriori estimate at time t", denoted $(-\hat{y}_t)$, is provided as output from the estimation block at line 83. It is multiplied by the matrix $(-HB)^{-1}$ at block 84, to yield the vector $\tilde{x}_t$ at line 85, which is provided as input to the control block 86. The output of the control block is the control signal vector $u_t$ (on line 87), which is multiplied by the matrix $(-HB)$ at block 88, and provided as input (line 89) to estimation circuit block 82. Note in particular that: $\tilde{x}_t$ (line 85) corresponds to line 710 of FIG. 7; $y_t$ (line 81) corresponds to line 302 of FIG. 3; $(-\hat{y}_t)$ (line 83) corresponds to line 307 of FIG. 3; and $(-HBu_t)$ (line 89) corresponds to line 309 of FIG. 3.

Detailed Example of ANN Implementation of Optimal Kalman Estimation

FIG. 3, discussed above, presented a circuit and data flow description of a neural network equivalent system (NNES) that performs Kalman optimal estimation. That description was given in terms of a sequence of neural computations to be performed, involving matrices and vectors. The neural computations can be implemented in hardware or software, as noted above with reference to the description of an NNES.

When an NNES is implemented as an ANN, a vector is implemented as a set of activity values over a set of nodes, and a matrix is implemented as a set of strengths of connections between a set of nodes and either the same set of nodes (in the case of "lateral" connections) or a different set of nodes.

Figure 9:
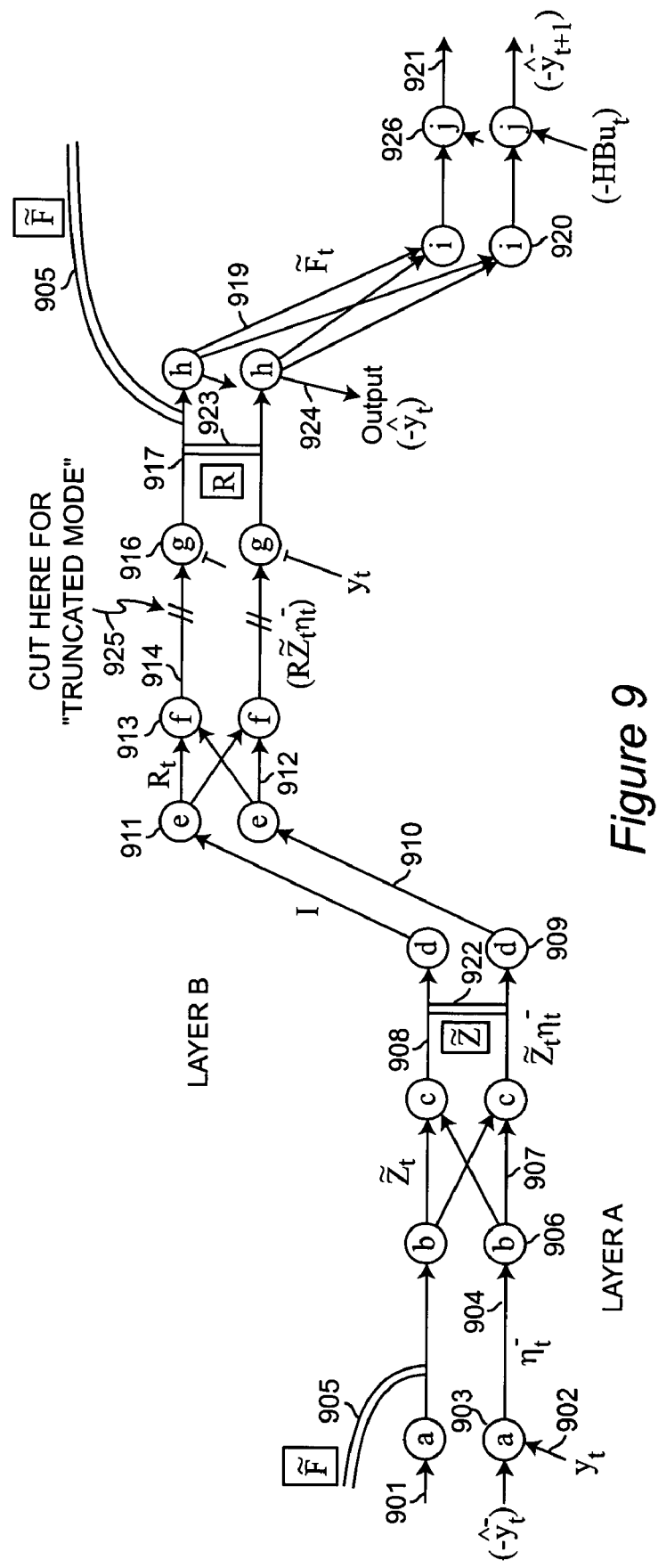
FIG. 9 illustrates an artificial neural network (ANN) flow diagram for optimal estimation, showing the flow of signal values, the nodes and connections of the neural network, connection weights, the computations that perform the execution process, and the computations that perform the learning process.

FIG. 9 describes an ANN implementation of the estimation process, in which (as also in the case of FIG. 3) both the learning and execution steps are performed by neural computations. In addition, FIG. 9 illustrates the learning of the matrices F and R. (Those matrices were, for simplicity, treated as having been specified to the network in the case of FIG. 3.) Thus FIG. 9 and the following description show how (a) optimal Kalman estimation, (b) the learning of the measurement noise covariance matrix, and (c) the learning of F, which is a problem in system identification, can all be performed by an NNES using only a stream of measurement vectors as inputs.

As discussed above, in the section entitled "Updating a Covariance Matrix or Inverse Covariance Matrix: Neural Network Methods", the updating and use of the inverse covariance matrix $Z_t^{-1}$, which corresponds to block 304 of FIG. 3, can be performed in an NNES by any of several methods. For the implementation described by FIG. 9, the "incremental covariance inverse learning" method is used. However, the other methods may be substituted for this if desired. The symbol Z denotes the matrix that is being updated to learn an approximation of the inverse covariance matrix $Z^{-1}$, in similar fashion to the use of M in the above-referenced section.

The flow diagram of FIG. 9 shows: the flow of signal values; the nodes and connections of a neural network; the connection weights, which are numerical values that in some cases are modified during processing; the computations that perform the execution process, by accepting input signal values and generating output signal values; and the computations that perform the learning process, by using the signal values at each end of a connection to modify the weight of that connection.

The entire diagram shows the flow of information at one time step t of the measurement process. Thus, the processing takes place in several sequential "substeps" as one passes from the left to the right end of the diagram. Each of these substeps is called a "tick". Each tick can correspond to one or more cycles in a conventional (clocked) computer or circuit. Alternatively, an unclocked circuit may be used provided that the results of various steps are each available at the required stage of the computation. The ticks are designated by lower-case letters a, b, . . . , j in alphabetical sequence. The next tick after tick j of time step t, is tick a of time step t+1, and at this point one "wraps around" the diagram, from the right edge to the left, while incrementing the time from t to t+1.

A plurality of neural network nodes is represented by two nodes denoted by circles, vertically disposed in the diagram. Circles that are horizontally disposed relative to each other denote the same node at different ticks. The tick letter is indicated inside each circle. The flow diagram is arranged in two "layers" denoted "Layer A" and "Layer B". Thus two nodes in Layer A and two nodes in Layer B are indicated, each at several different ticks. There is no requirement that the nodes actually be disposed as geometric layers; the term "layer" here simply denotes that there are two distinct sets of nodes.

The connections between distinct nodes are represented by lines from one node at a given tick, to the other node at the next tick. The connections between each node and itself, or equivalently the processing that may take place within each individual node, are represented by a horizontal line from each node at a given tick, to the same node at the next tick. Some of the lines are labeled by symbols; each such symbol either represents the value of the signal being carried on that line during that interval between adjacent ticks, or the connection weight by which the signal at the earlier tick is multiplied to obtain the signal at the next tick. A labeled double-line, drawn from one ordinary line to another ordinary line, represents a portion of the learning process, in which each connection weight denoted by the matrix symbol (which is drawn within a box) is modified by an amount that depends on the signal values on the ordinary lines between which the double-line is drawn. The signal values are denoted by symbols; for example, the new measurement at time t is denoted by $y_t$. Recall that the measurement is a vector, or set of numerical values; in the neural network, each such value (i.e., each component of the vector) is provided as input to a distinct node. In the diagram, the notation is simplified by using the symbol for the vector, and so labeling a line to only one of the plurality of nodes.

We first describe the flow of the computations at some time index t for which the execution and learning processes are already underway. The initialization phase, as well as the so-called "truncation mode" referred to at step 925, will be discussed later. Starting at the left edge of the diagram, line 901 carries signal $(-\hat{y}_t^-)$. The quantity $\hat{y}_t^-$ is called the "a priori estimate at time t"; i.e., the measurement estimate that the method of the present invention has computed for time t using only measurements available at time t−1. Line 902 carries signal $y_t$, the new measurement at time t. The two input signals are summed by each node 903 at tick a, producing on line 904 the signal $\eta_t^-$, called the "measurement residual". Continuing with the description of the execution process (and returning later to the learning process in which double-line 905 participates), we reach tick b at step 906. The signal value at each node is now multiplied by the weight of each connection that starts at that "source" node, and the signal values delivered by all of the connections that end at each "target" node are then summed. Mathematically, the rth source node at tick b carries the rth component of the vector $\eta_t^-$; we denote this component by $(\eta_t^-)^r$. The component of the weight matrix $\check{Z}_t$ that connects source node r to target node s, along lines 907, is denoted by $\check{Z}_t^{sr}$. Then the summed signal received at node s at tick c is given by $\Sigma_r \check{Z}_t^s (\eta_t^-)^r$. In matrix notation, this sum is the sth element of the vector formed by the matrix product $\check{Z}_t \eta_t^-$, which labels the lines 908 that emerge from the nodes at tick c. Thus the set of nodes of Layer A at tick d (step 909) carry the signal values corresponding to the components of the matrix product $\check{Z}_t \eta_t^-$.

These signal values are transmitted unchanged along lines 910 to the nodes of layer B at tick e (step 911). (The symbol I denotes the identity matrix, which leaves a vector of values unchanged.) The signals at step 911 are matrix-multiplied by the matrix denoted $R_t$, whose components are the weights of the connections 912 between the nodes of Layer B. The signal values of these nodes at tick f (step 913), and on its output lines 914, are therefore the components of the vector $R_t \check{Z}_t \eta_t^-$. Next, the measurement $y_t$ (the same measurement as was provided as input along line 902) is provided again on line 915 as input to the nodes of layer B. At tick g (step 916) the nodes of Layer B subtracts the respective components of $y_t$ from the inputs from lines 914.

The resulting output vector, whose values are represented by the signals on lines 917, is $(-\hat{y}_t)$. The vector $\hat{y}_t$ is the "a posteriori estimate at time t"; i.e., the measurement estimate that the method of the present invention has computed for time t using the measurements available at time t including the new measurement $y_t$. The quantity $(-\hat{y}_t)$ is the result of the estimation execution process, which has now combined the new measurement $y_t$ with a quantity (matrix product) derived from $\eta_t^-$, and thereby from $y_t$ and the a priori estimate $\hat{y}_t^-$. We shall shortly see that the a priori estimate is in turn derived from the a posteriori estimate at the previous time step, thereby completing the estimation process of combining the current measurement with the estimate from a previous time step.

The signal values corresponding to $(-\hat{y}_t)$ are conveyed to the nodes of Layer B at tick h (step 918). These values are provided as output along lines 924. They are also matrix-multiplied (using the connections 919 that lead from Layer B to Layer A) by the matrix of weights $\mathbb{F}_t$, to yield signal values at the nodes of Layer A at tick i (step 920). If a control action or other external action, as designated by $u_t$ in Equation 1, is present, then it has an effect on the estimation process by contributing a set of input signal values, corresponding to the vector $(-HBu_t)$, at tick j (step 926). The output lines 921 from tick j carry the components of the vector $(-\hat{y}_{t+1}^-)$, which is the negative of the a priori estimate at the next time step t+1. These output lines are "wrapped around" as described above, to become lines 901 at the left edge of the diagram at the next time step. Since t is incremented by one, the vector denoted $(-\hat{y}_{t+1}^-)$ at line 921 is identical to the vector denoted $(-\hat{y}_t^-)$ at line 901. This completes the description of the execution process, except for the initialization of that process and the description of the "truncated mode" referred to above. We return to these later.

We next describe the learning process, again deferring a discussion of initialization. There are three sets of modifiable connection weights in this implementation. $\check{Z}_t$, $R_t$, and $\mathbb{F}_t$. The role of the learning process is to cause: the weight matrix $\check{Z}_t$ to converge to $Z^{-1}$ where Z is defined by Equation 14; the weight matrix $R_t$ to converge to the measurement noise covariance matrix R which was defined following Equation 2; and the weight matrix $\mathbb{F}_t$ to converge to the matrix $\mathbb{F}$ defined following Equation 15.

Learning of Z: At step 922, between ticks c and d, and for each pair of Layer A nodes indexed by r and s, the values of the vector $(\check{Z}_t \eta_t^-)$ at nodes r and s are combined to yield a modification term. This modification term is then added to the weight $\check{Z}_t^{sr}$ of the connection from node r to node s. This step constitutes the portion of the learning process that modifies $\check{Z}_t$ to yield $\check{Z}_{t+1}$.

Specifically, the learning rule used is:

$$\check{Z}_{t+1} = (1+\gamma_Z)\check{Z}_t - \gamma_Z (\check{Z}_t \eta_t^-)(\check{Z}_t \eta_t^-)', \qquad (35)$$

where $\gamma_Z$ is a small positive learning rate (as are also the other learning rates $\gamma_R$ and $\gamma_F$ to be introduced below). This learning rule is an example of "Incremental Covariance Inverse Learning" as discussed above in the section entitled "Updating a Covariance Matrix or Inverse Covariance Matrix: Neural Network Methods". As discussed in that section, one may alternatively use a time-dependent learning rate $\gamma$. Such a time-dependent rate may usefully be tuned both to increase convergence speed and to avoid divergence or excessive stochastic fluctuation of the matrix being learned.

Learning of $\mathbb{F}$: Note that step 905 (the doubled line) appears on both the left and right hand sides of the diagram; this doubled line is understood to "wrap around" the diagram from the right to the left edge, corresponding to an operation that uses activity values computed at time t (after tick g ) and time t+1 (after tick a). At step 905, for each node r of Layer B and each node s of Layer A, the value $(-\hat{y}_t^r)$ at line 917 and the value $(\eta_t^-)^s$ at line 904 are combined to yield a modification term, which is then added to the weight $\mathbb{F}_t^{sr}$ of the connection 919 from node r to node s. In this embodiment, the learning of $\mathbb{F}_t$ occurs only when the system is not operating in truncated mode. It is understood that the layer-B activity present just before tick h of time step t persists unchanged until after tick a of time step t+1.

To derive the specific learning rule for $\mathbb{F}$ in this implementation, we seek to minimize the mean square a priori measurement estimation error, which is $\mathrm{MSE}(\eta_{t+1}^-) \equiv E[(\eta_{t+1}^-)'(\eta_{t+1}^-)]$. Using $\hat{y}_t = H\hat{x}_t$ and $$\begin{aligned}\eta_{t+1}^- &= y_{t+1} - H\hat{x}_{t+1}^- \\ &= y_t - HF\hat{x}_t - HBu_t \\ &= y_{t+1} - \tilde{F}\hat{y}_t - HBu_t,\end{aligned} \quad (36)$$

we find that the negative gradient of $\tfrac{1}{2}\mathrm{MSE}(\eta_{t+1}^-)$ with respect to the elements of the matrix $\mathbb{F}$ is given by $$-\tfrac{1}{2}\partial \mathrm{MSE}(\eta_{t+1}^-)/\partial \tilde{F} = E[\eta_{t+1}^- \hat{y}_t']. \quad (37)$$

The circuit implements stochastic gradient descent in $\mathbb{F}$ by using, instead of this expectation value, the current value of the matrix $(\eta_{t+1}^- \hat{y}_t')$. This yields the learning rule for $\mathbb{F}$:

$$\hat{F}_{t+1} = \tilde{F}_t - \gamma_F(\eta_{t+1}^-)(-\hat{y}_t'). \quad (38)$$

This is an "anti-Hebbian" learning rule, since it decreases each connection weight by an amount proportional to the product of the activity $(-\hat{y}_t)^r$ at source node r times the activity $(\eta_{t+1}^-)^s$ at target node s.

Learning of R, and use of "truncated mode" operation: The connection weight matrix (denoted by R or $R_t$) that will represent an approximation of the covariance matrix of the measurement noise (also denoted by R), can be determined as follows. (1) If the measurement noise covariance matrix R is known, then the corresponding connection strength matrix may be directly set equal to R and remain unchanged thereafter (unless the measurement noise statistics themselves change with time). No R learning occurs in this case. (2) As has been described in prior art concerning the Kalman filter, one may turn off external input to the measurement sensors (we refer to this as "offline" operation), let the sensors run in this "offline" mode and generate sensor readings that are instances of the measurement noise alone, and use these readings to determine R. In the method of the present invention, the sensor readings generated by this offline operation can be used within the neural network described above, to yield a strictly neural computation of R. To do this, the method is run in "truncated mode", during which the neural circuit is temporarily cut at step 925. In this mode, the "measurement" input $y_t$ is simply an instance of the measurement noise process, which we denote as $n_t$. The noise term $n_t$ has covariance R. Starting with an arbitrary initial matrix $\hat{R}_1$, the modification of $\hat{R}$ described above will cause $\hat{R}_t$ to converge to an approximation of the measurement noise covariance matrix R. One can either run in "truncated mode" first, and then run in normal "online" mode, in which there is external input to the sensors (reconnecting the cut at step 925); or one can alternately and intermittently run in normal mode (the full circuit operation described above) and in truncated mode, each time cutting and then reconnecting the lines at step 925.

In "truncated mode", the circuit is effectively "cut" just before the step marked by tick g, and the input at step g consists of noise only, $(-y_t) = -n_t$. That is, the external signal input $Hx_t$ has been cut off and does not reach the measurement sensors. We then use the Hebbian learning rule:

$$R_{t+1} = (1-\gamma_R)R_t + \gamma_R \tilde{n}_t \tilde{n}_t'. \quad (39)$$

This rule uses a running average, or trace, of the values of $\tilde{n}_t \tilde{n}_t'$ obtained during "truncated mode" operation. Note that if the covariance of the measurement noise does not change over time, it is useful to choose the learning rate $\gamma_R$ to vary with time according to $\gamma_R(t)=1/t$, in which case the above equation yields $R_t = \langle n'\rangle$, where the average is over the set of noise values presented through time step t.

Initialization phase: We turn now to the initialization phase (denoted as time step t=1), for both the signal values and the connection weights. This phase starts with step 925, at which the initial input from line 914 is assumed absent (or zero). This is denoted by the marking "cut here for truncated mode" at step 925. Thus the initial signal value input to the nodes of Layer B at tick g is simply the first measurement $y_1$. After time step t=1 is completed, the full flow diagram is used as described above, with no cut at step 925.

The matrix $\mathbb{Z}_t$ and the matrix $\mathbb{F}_t$ can both be conveniently initialized to be proportional to the identity matrix; that is, $\mathbb{Z}_2^{nn} = c_Z$, $\mathbb{F}_1^{nn} = c_F$, and $\mathbb{Z}_2^{nm} = \mathbb{F}_1^{nm} = 0$ for $n \neq m$, with $c_Z > 0$.

Figure 10:
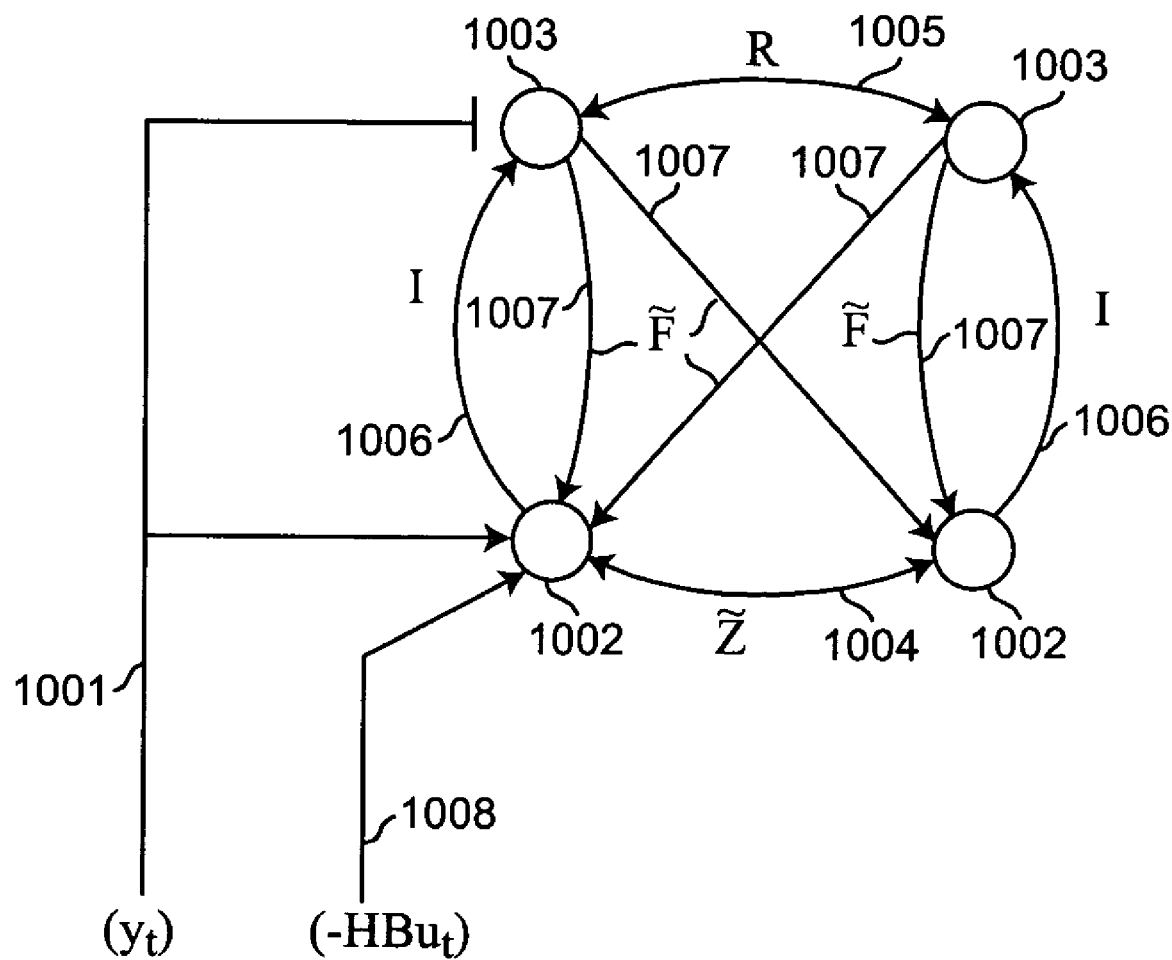
FIG. 10 illustrates an ANN for optimal estimation, showing only nodes and connections, but not the detailed flow of signal values at each time.

Components of the ANN circuit for optimal estimation: FIG. 10 illustrates the physical elements of an ANN whose operation was described above in relation to FIG. 9. FIG. 10 shows only the nodes and connections, but not the flow of the processing with time and from one tick to the next. Layers A and B are shown as the lower and upper layers of nodes, respectively. Of the plurality of nodes in each layer, two representative nodes are shown (horizontally disposed within each layer). Lines 1001 provide the components of input vector $y_t$ (the current measurement at time t) to the nodes 1002 of Layer A and also to the nodes 1003 of Layer B. These inputs to nodes 1003 are with negative sign, as indicated by the "T"-shaped terminator (as opposed to an arrow). The other input vector $(-HBu_t)$, which is present when there is a control signal or other vector denoted by $u_t$ that is influencing the plant state, is provided by line 1008 to the nodes 1002 of Layer A. The lateral (i.e., within-layer) connections 1004 between nodes of Layer A have weights corresponding to the matrix elements of $\mathbb{Z}_t$. The lateral connections 1005 between nodes of Layer B have weights corresponding to the matrix elements of $R_t$. Each of these lateral connections may be implemented either as a single undirected connection, or as a pair of directed connections. The feed-forward connections 1006 from each node of Layer A to the corresponding node of Layer B have fixed weights of value one (denoted by the identity matrix I). The feedback connections 1007 from each node of Layer B to each node of Layer A have weights corresponding to the matrix elements of $\mathbb{F}_t$.

Numerical Results

The performance of the neural system shown in FIG. 9 is illustrated for a particular numerical case, using a two-dimensional dynamical system. Here it is assumed that the matrix F that describes the deterministic plant dynamics, the matrix H that describes the deterministic relation between a plant vector and a measurement vector, the plant noise covariance matrix Q, and the measurement noise covariance matrix R, are not specified to the neural system. The matrix $\mathbb{F} = HFH^{-1}$ will be learned by the operation of the neural system, and this is the only combination of F and H that is required for the estimation process being performed. The matrix R will be learned by use of the "truncated mode" operation described above. The matrix Q will not need to be learned explicitly by the neural system, since it is not needed for the determination of either the estimation matrix $(I-K_tH)$ or of the measurement estimates according to the method of the present invention. As in FIG. 9, the "incremental inverse covariance learning" method is used to learn the matrix $Z^{-1}$.

The plant and measurement parameters are set arbitrarily to be:

$$F=[0.9816,-0.1908; 0.1908,-0.9816] \quad (40)$$

(where the 2×2 matrix values are denoted by $[F_{11}, F_{12}; F_{21}, F_{22}]$), corresponding to a rotation through 11 degrees;

$$H=[0.7431,-0.6691;0.6691,0.7431] \quad (41)$$

(rotation through 42 degrees);

$$Q=[0.1,0.03;0.03,0.2] \quad (42)$$

$$R=[0.039,-0.006;-0.006, 0.027]. \quad (43)$$

A total of 5000 time steps are shown. Learning rates are $\gamma_Z=\gamma_R=0.003$ and $\gamma_F=0.0003$. No attempt is made here to optimize the speed of learning.

The a posteriori state estimate error, $\xi_t=x_t-\hat{x}_t$, is a diagnostic measure of the performance of both the neural and the classical estimation method. To compute this error for the neural method, we use the a posteriori measurement estimates $\hat{y}_t$, obtained from the neural circuit, to compute $\hat{x}=H^{-1}\hat{y}_t$. We then compute $\xi_t(\text{neural})=x_t-\hat{x}_t$. Using the classical Kalman matrix equations (see Equations 1 through 9) we compute $\xi_t(\text{clas})$.

Figure 11A:
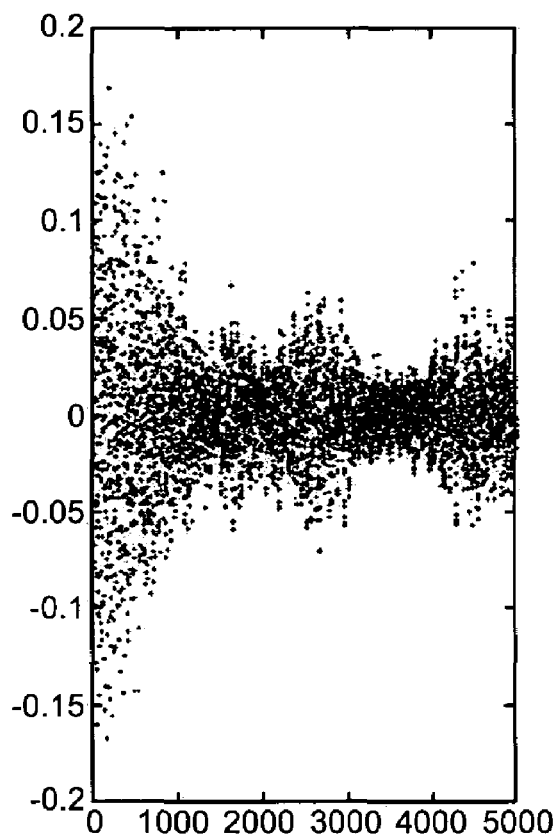
FIGS. 11A and 11B are graphs showing the difference between the a posteriori plant state estimate computed from the output of an ANN according to the present invention, and the corresponding estimate computed using the classical Kalman estimation equations, for each of two vector components.
Figure 11B:
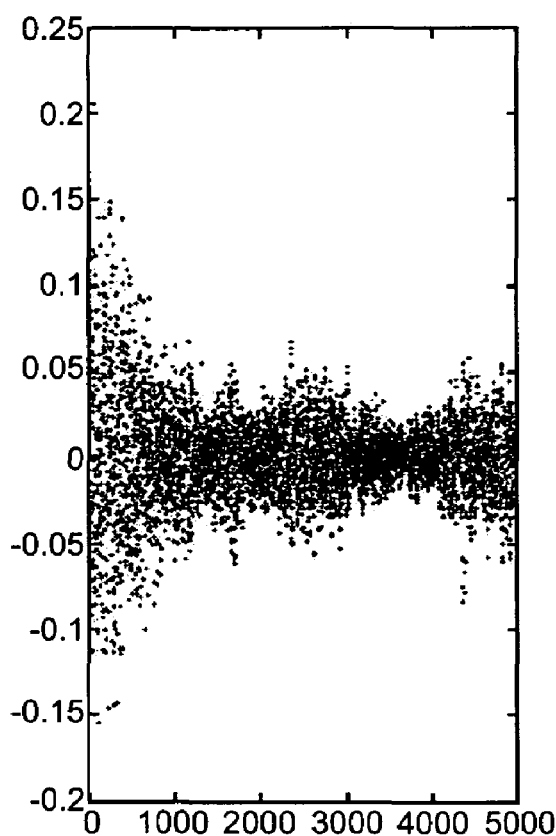
Figure 13A:
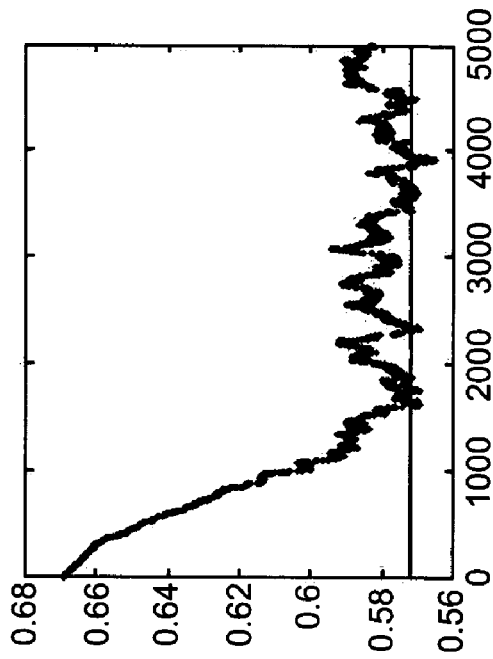
FIGS. 13A, 13B, 13C, and 13D are graphs showing the neurally learned values of the Kalman filter $K_t$ vs. time, and the solution using the classical Kalman estimation equations.
Figure 13B:
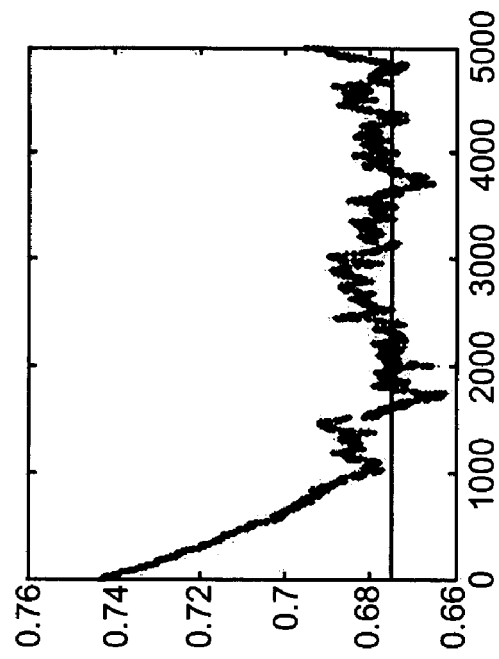
Figure 13C:
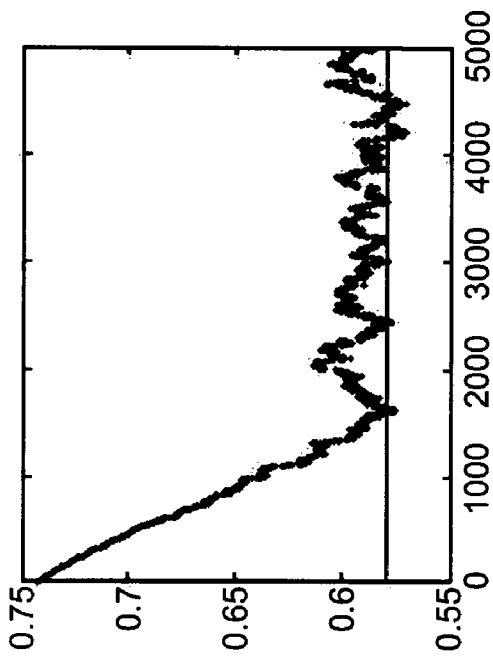
Figure 13D:
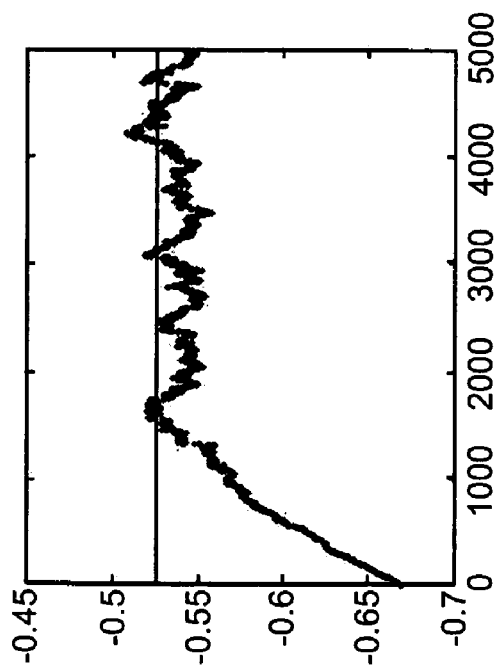

FIGS. 11A and 11B shows the difference $[\xi_t(\text{clas})-\xi_t(\text{neural})]$ vs. time, for each of the two vector components. That is, the vector that represents the a posteriori state estimate error computed using the neural circuit, is subtracted from the vector that represents the a posteriori state estimate error computed using the classical Kalman filter equations. The first component of this difference of two vectors is plotted in FIG. 11A as a function of time. The second component of this difference is plotted in FIG. 11B.

FIGS. 12A, 12B, 12C, and 12D show the neurally learned values of $(I-HK_t)$ vs. time, and the classical Kalman matrix solution. The 2×2 matrix components are shown in the subplots. That is, the (1,1) component of the neurally learned matrix $(I-HK_t)$ is plotted versus time as the jagged line, and the same component of the classical Kalman matrix solution is shown as a horizontal line, in FIG. 12A; the (1,2) components in FIG. 12B; the (2,1) components in FIG. 12C; and the (2,2) components in FIG. 12D. It is to be noted that the jagged curves converge to the horizontal line in each case, then fluctuate around that line owing to the random character of the noise in the plant state and measurement processes. Note that the ordinate axis scale differs for the various components, so that although the fluctuations appear visually to be large for the (2,1) component, for example, the magnitude of the fluctuations are only of the order of 0.01 (similar to that for the other components in this case).

FIGS. 13A, 13B, 13C, and 13D show the neurally learned values of the Kalman filter $K_t$ (obtained from the $(I-HK_t)$ results by using the known H) vs. time, and the classical Kalman matrix solution. The presentation is similar to that described in FIG. 12.

FIGS. 14A, 14B, 14C, and 14D show the neurally learned values of $(-F_t)$ vs. time, and the exact values of $(-HFH^{-1})$, shown as a horizontal line in each figure part. The exact values are known from our specification of the plant dynamics above, but have not been specified to the neural system. Note that the neurally learned values converge to the horizontal line in each case (apart from small random fluctuations). The presentation is similar to that described in FIG. 12.

While the invention has been described in terms of preferred embodiments, those skilled in the art will recognize that the invention can be practiced with modification within the spirit and scope of the appended claims.

Having thus described my invention, what I claim as new and desire to secure by Letters Patent is as follows:

1. A method for estimation, comprising the steps of:
   (a) specifying an estimation error criterion, a class of allowed estimation functions, an initial estimation function selected from said class, and an initial measurement estimate,
   (b) inputting at least one measurement vector,
   (c) determining an updated estimation function using said estimation error criterion, a previously determined estimation function, a previous measurement estimate, and said at least one measurement vector,
   (d) determining an updated measurement estimate using an estimation function and said measurement vector,
   (e) outputting said updated measurement estimate, and
   (f) iterating steps (b) through (e) a plurality of times, wherein the step of determining an updated estimation function is performed using a neural network equivalent system (NNES).

2. The method of claim 1, wherein the estimation error computed using said estimation error criterion approximates its minimum achievable value as the number of times said steps are repeated is increased.

3. The method of claim 1, wherein the result of said step of determining an updated estimation function does not depend directly on a plant state.

4. The method of claim 1, wherein said class of allowed estimation functions comprises a set of functions that compute a linear combination of said measurement vector and said previous measurement estimate, to produce said updated measurement estimate.

5. The method of claim 1, wherein said updated estimation function is jointly implemented by two or more sets of connection weights.

6. The method of claim 1, wherein said updated estimation function approximates a Kalman filter or extended Kalman filter estimation function.

7. The method of claim 6, further comprising the step of specifying a tolerance within which said updated estimation function is required to approximate said Kalman filter or extended Kalman filter estimation function, wherein said tolerance is met by performing a plurality of said iterations.

8. The method of claim 6, wherein said updating of the estimation function is performed by an incremental learning process at each time step.

9. The method of claim 1, wherein a plurality of measurement vectors is inputted, and wherein said step of determining an updated estimation function comprises the substeps of:
   (a) determining a plurality of update quantities, one said update quantity corresponding to each of said plurality of measurement vectors, and
   (b) performing said updating of the estimation function by combining said plurality of update quantities.

10. The method of claim 9, wherein said updated estimation function approximates a Kalman filter or extended Kalman filter estimation function.

11. The method of claim 10, wherein the closeness with which said estimation function approximates that produced by classical Kalman estimation or extended Kalman estimation, is improved as the number of said measurement vectors and said update quantities is increased.

12. The method of claim 1, further comprising the step of determining at least one parameter that describes the dynamics of a plant state, by means of a neural network equivalent system (NNES).

13. The method of claim 1, wherein said steps of determining an updated estimation function and of determining an updated measurement estimate are performed by means of a single neural network equivalent system (NNES).

14. The method of claim 13, wherein said measurement vector is input to the NNES at a plurality of distinct locations.

15. The method of claim 1 wherein said step of determining an updated estimation function comprises the substeps of:
   (a) computing a plurality of measurement residual vectors, and
   (b) computing an approximation of the covariance matrix and/or the covariance matrix inverse of said plurality of measurement residual vectors.

16. A method for control, comprising the steps of:
   (a) specifying a control cost criterion, a class of allowed control functions, and an initial control function selected from said class,
   (b) specifying a sequence of time values,
   (c) for each time value in said sequence of time values, determining an updated control function corresponding to said time value using said control cost criterion and a previously determined control function,
   (d) inputting state data comprising at least one of a plant state vector, a measurement vector, or a measurement estimate,
   (e) determining a control vector using one of said updated control functions and said state data,
   (f) outputting said control vector,
   (g) optionally iterating steps (d) through (f) one or more times,
   (h) iterating steps (b) through (g) one or more times,
wherein step (c) is performed using a neural network equivalent system (NNES).

17. The method of claim 16, wherein:
   (a) step (c) comprises storing at least one said updated control function using storage means, and
   (b) step (e) comprises obtaining said one of said updated control functions from said storage means.

18. The method of claim 16, wherein said step of specifying a sequence of time values comprises specifying a target time, and wherein each of said time values is less than said target time.

19. The method of claim 16, wherein said updated control function approximates a Kalman control function.

20. The method of claim 19, further comprising the step of specifying a tolerance within which said updated control function is required to approximate said Kalman control function, wherein said tolerance is met by performing a plurality of said iterations.

21. The method of claim 16, wherein the control cost computed using said control cost criterion approximates its minimum achievable value.

22. The method of claim 16, wherein the result of said step of determining an updated control function does not depend directly on a plant state.

23. The method of claim 16, wherein said steps of determining an updated control function and of determining a control vector are performed by means of a single neural network equivalent system (NNES).

24. The method of claim 16, wherein said step of determining an updated control function comprises the substeps of:
   (a) computing a plurality of activity vectors, and
   (b) computing an approximation of the covariance matrix and/or the covariance matrix inverse of said plurality of activity vectors.

25. A method for combined estimation and control, comprising the steps of:
   an estimation step comprising the steps of:
   (a) specifying an estimation error criterion, a class of allowed estimation functions, an initial estimation function selected from said class, and an initial measurement estimate,
   (b) inputting at least one measurement vector,
   (c) determining an updated estimation function using said estimation error criterion, a previously determined estimation function, a previous measurement estimate, and said at least one measurement vector,
   (d) determining an updated measurement estimate using an estimation function and said measurement vector,
   (e) outputting said updated measurement estimate, and
   (f) iteration of steps (b) through (e) a plurality of times,
wherein the step of determining an updated estimation function is performed using a neural network equivalent system, and
   a control step comprising the steps of:
   (g) specifying a control cost criterion, a class of allowed control functions, and an initial control function selected from said class,
   (h) specifying a sequence of time values,
   (i) for each time value in said sequence of time values, determining an updated control function corresponding to said time value using said control cost criterion and a previously determined control function,
   (j) inputting state data comprising at least one of a plant state vector, a measurement vector, or a measurement estimate,
   (k) determining a control vector using one of said updated control functions and said state data,
   (l) outputting said control vector,
   (m) optionally iterating steps (j) through (l) one or more times,
   (n) iterating steps (h) through (m) one or more times,
wherein step (i) is performed using a neural network equivalent system (NNES),
wherein said estimation and control steps are performed by a single neural network equivalent system (NNES).

26. In a method for estimation, control, system identification, reinforcement learning, supervised learning, unsupervised learning, and/or classification, comprising a step of iteratively transforming a first matrix into a second matrix, the improvement comprising the steps of:
   (a) specifying a functional relationship between said first matrix and a first set of vectors,
   (b) specifying a transformation of each vector in said first set of vectors into a vector of a second set of vectors,
   (c) implementing said first set of vectors as a first set of activity vectors in a neural network equivalent system (NNES),
   (d) implementing an approximation of said first matrix as a first set of connection strength values in said NNES,
   (e) determining, by means of neural computations, a second set of connection strength values as a function of said first set of activity vectors, and (f) determining, by means of neural computations, a second set of activity vectors as a function of said first set of activity vectors and of said first set of connection strength values, wherein said second set of connection strength values approximates said second matrix.

27. The method of claim 26, wherein said step of iteratively transforming a first matrix into a second matrix comprises solving a Riccati equation.

28. The method of claim 26, wherein said functional relationship between said first matrix and a first set of vectors is selected from the group consisting of (a) the functional relationship wherein said first matrix is equal or approximately equal to the covariance matrix of said first set of vectors and (b) the functional relationship wherein said first matrix is equal or approximately equal to the inverse of the covariance matrix of said first set of vectors.

29. The method of claim 26, wherein said method is a method selected from the group consisting of Kalman estimation, extended Kalman filtering, and Kalman control.

30. A neural network equivalent system (NNES), having a processor, comprising:
a plurality of activity vectors and at least one set of connection strength values, wherein said set of connection strength values is updated using a learning rule that comprises the application of a ganging operation to said plurality of activity vectors.

31. The system of claim 30, wherein said NNES is an NNES for estimation and/or control.

32. The system of claim 30, wherein said ganging operation performs a function selected from the group consisting of (a) approximating the covariance matrix of said plurality of activity vectors and (b) approximating the inverse of the covariance matrix of said plurality of activity vectors.

33. The system of claim 30, wherein said NNES is a hardware artificial neural network (ANN) or circuit and said ganging operation comprises the determination of which sets of activity vectors are to be ganged together at each of a plurality of time steps.

34. The system of claim 33, wherein said determination makes use of the relative timing and/or synchronization of the activities at a plurality of nodes.

35. A neural network equivalent system (NNES) for estimation and/or control comprising:
(a) a plurality of nodes connected to perform a sequence of steps in a prescribed order,
(b) said plurality of nodes comprising processors programmed or constructed to perform an execution step and/or a learning step using neural computations,
(c) input means for providing measurement values to said plurality of nodes,
(d) neural computation means for determining a plurality of measurement estimates, plant state estimates, and/or control vector signals using said measurement signals, and
(e) means for outputting said plurality of measurement estimates, plant state estimates, and/or control vector signals.

36. The NNES of claim 35, wherein said execution step combines at least one measurement and a first set of at least one measurement estimate using an estimation function to determine a second set of at least one measurement estimate.

37. The NNES of claim 35, wherein said learning step determines a second estimation function, using the first estimation function, a set of at least one measurement, and a set of at least one measurement estimate.

38. The NNES of claim 35, wherein:
(a) said processors compute a matrix of connection weights by learning within the NNES,
(b) the computation by said processors of said matrix of connection weights is influenced by past observations, and
(c) said matrix of connection weights cause a quantitative blending of an a priori estimated measurement vector with an actual measurement to obtain a measurement estimate that is closer than the actual measurements to what the actual measurement would have been in the absence of measurement noise.

39. The NNES of claim 38, wherein the learned weights satisfy or tend to approximate a Kalman optimal filter.

40. The NNES of claim 35, wherein the NNES is a recurrent NNES.

41. The NNES of claim 35, wherein the NNES comprises multiple physical layers of connected nodes in which selected nodes in separate layers are interconnected.

42. A recurrent neural network equivalent system (NNES), having a processor, for estimation wherein a measurement vector is input to the network at a plurality of distinct locations and/or distinct times.

43. A recurrent neural network equivalent system (NNES), having a processor, for estimation and/or control, comprising time-sequencing means whereby:
(a) the data flow is organized in time using major and minor time steps,
(b) each of said major time steps corresponds to the input of at least one measurement vector,
(c) each of said major time steps is divided into a plurality of minor time steps, and
(d) the data flow is organized so that specified network functions are carried out at specified locations and at specified minor time steps.

44. A recurrent neural network equivalent system (NNES) for estimation and/or control comprising:
(a) means for inputting a plurality of measurement vectors,
(b) means for learning an estimation and/or control function using said measurement vectors, and
(c) means for performing system identification using said measurement vectors.

45. A recurrent neural network equivalent system (NNES) for estimation and/or control comprising:
(a) means for storing, as a set of connection strengths, the values of a matrix,
(b) means for updating said values of said matrix, and
(c) means for computing the result of multiplying an activity vector by a member selected from the group consisting of said matrix and the inverse of said matrix.

46. The recurrent NNES of claim 45 wherein said means for updating said values of said matrix comprises:
(a) means for generating a plurality of matrix update instances, and
(b) means for combining said plurality of matrix update instances to determine said updated values of said matrix.

* * * * *

UNITED STATES PATENT AND TRADEMARK OFFICE
CERTIFICATE OF CORRECTION

PATENT NO.         : 7,395,251 B2
APPLICATION NO. : 11/171447
DATED                 : July 1, 2008
INVENTOR(S)        : Linsker It is certified that error appears in the above-identified patent and that said Letters Patent is hereby corrected as shown below:

In column 32, lines 25 to 28 please correct as follows:

(f) iterating steps (b) through (e) a plurality of times,
[[    ]] wherein the step of determining an updated estimation
function is performed using a neural network equivalent
system (NNES).

In column 35, lines 1 to 5 please correct as follows:

(f) determining, by means of neural computations, a sec-
ond set of activity vectors as a function of said first set of
activity vectors and of said first set of connection strength values, _____
wherein said second set of connection strength values approximates
said second matrix.

Signed and Sealed this

Sixteenth Day of September, 2008

JON W. DUDAS
*Director of the United States Patent and Trademark Office*